US012193592B2

(12) United States Patent
Luo et al.

(10) Patent No.: US 12,193,592 B2
(45) Date of Patent: Jan. 14, 2025

(54) EXHAUST ASSEMBLY, UPPER COVER ASSEMBLY, AND COOKING DEVICE

(71) Applicant: FOSHAN SHUNDE MIDEA ELECTRICAL HEATING APPLIANCES MANUFACTURING CO., LIMITED, Foshan (CN)

(72) Inventors: Guanghua Luo, Foshan (CN); Yuansheng Deng, Foshan (CN); Yanping Song, Foshan (CN)

(73) Assignee: FOSHAN SHUNDE MIDEA ELECTRICAL HEATHING APPLIANCS MANUFACTURING CO., LIMITED, Foshan (CN)

( * ) Notice: Subject to any disclaimer, the term of this patent is extended or adjusted under 35 U.S.C. 154(b) by 778 days.

(21) Appl. No.: 17/435,700

(22) PCT Filed: Jul. 2, 2019

(86) PCT No.: PCT/CN2019/094423
§ 371 (c)(1),
(2) Date: Sep. 2, 2021

(87) PCT Pub. No.: WO2020/232797
PCT Pub. Date: Nov. 26, 2020

(65) Prior Publication Data
US 2022/0151424 A1 May 19, 2022

(30) Foreign Application Priority Data

May 21, 2019 (CN) .......................... 201910423940.4
May 21, 2019 (CN) .......................... 201920730208.7

(51) Int. Cl.
*A47J 27/08* (2006.01)
*A47J 27/09* (2006.01)
(Continued)

(52) U.S. Cl.
CPC ............... *A47J 27/08* (2013.01); *A47J 27/09* (2013.01); *A47J 36/10* (2013.01); *A47J 36/38* (2013.01); *A47J 27/082* (2013.01)

(58) Field of Classification Search
CPC ........ A47J 27/08; A47J 27/0802; A47J 27/09; A47J 27/092; A47J 36/38
See application file for complete search history.

(56) References Cited

U.S. PATENT DOCUMENTS

| 2015/0136769 A1* | 5/2015 | Quinn | A47J 36/10 220/240 |
| 2019/0008310 A1* | 1/2019 | Kim | A47J 27/086 |
| 2020/0128996 A1* | 4/2020 | Qin | A47J 27/09 |

FOREIGN PATENT DOCUMENTS

| CN | 203182678 U | 9/2013 |
| CN | 103908164 A | 7/2014 |

(Continued)

OTHER PUBLICATIONS

First OA of China Application No. 201910423940.4.
First Search of China Application No. 201910423940.4.
ISR of International Application No. PCT/CN2019/094423.

*Primary Examiner* — Reginald Alexander

(57) ABSTRACT

An exhaust assembly, an upper cover assembly, and a cooking device. The exhaust assembly includes: an exhaust system can be opened and closed; an exhaust trigger member that is connected to the exhaust system and suitable for triggering the opening of the exhaust system; a reset trigger member that is connected to the exhaust system and suitable for triggering the closing of the exhaust system; and a toggle member adapted to move between an exhaust position and a close position, and when located at the exhaust position, the toggle member actions on the exhaust trigger member and makes the exhaust trigger member trigger the opening of the exhaust system, and when located at the close position, (Continued)

the toggle member actions on the reset trigger member and makes the reset trigger member trigger the closing of the exhaust system.

17 Claims, 12 Drawing Sheets

(51) Int. Cl.
    *A47J 36/10*     (2006.01)
    *A47J 36/38*     (2006.01)
    *A47J 27/082*    (2006.01)

(56) References Cited

FOREIGN PATENT DOCUMENTS

| | | |
|---|---|---|
| CN | 205433320 U | 8/2016 |
| CN | 206228184 U | 6/2017 |
| CN | 107296484 A | 10/2017 |
| CN | 206761423 U | 12/2017 |
| CN | 207477350 U | 6/2018 |
| CN | 207755036 U | 8/2018 |
| CN | 108618597 A | 10/2018 |
| CN | 208002612 U | 10/2018 |
| CN | 109316056 A | 2/2019 |
| CN | 208447285 U | 2/2019 |
| JP | 2012249945 A | 12/2012 |
| WO | 9730616 A1 | 8/1997 |

\* cited by examiner

EXHAUST ASSEMBLY, UPPER COVER ASSEMBLY, AND COOKING DEVICE

CROSS-REFERENCES TO RELATED APPLICATIONS

The present disclosure is a national phase application of International Application No. PCT/CN2019/094423, filed on Jul. 2, 2019, which claims the priorities of Chinese Patent Application No. 201910423940.4 and No. 201920730208.7, filed on May 21, 2019, the entireties of which are herein incorporated by reference.

FIELD

The present disclosure relates to the field of cooking devices, and particularly relates to an exhaust assembly, an upper cover assembly, and a cooking device.

BACKGROUND

In the existing cooking devices such as pressure cookers, buttons are provided for a user to press to correspondingly control the opening or closing of the exhaust valve. However, such a structure does not have good operation comfort, and the operation interface of the product does not have good simplicity and intuitiveness.

SUMMARY

In order to solve at least one of the above problems, one embodiment of the present disclosure is to provide an exhaust assembly.

Another embodiment of the present disclosure is to provide an upper cover assembly including the exhaust assembly described above.

A further embodiment of the present disclosure is to provide a cooking device including the exhaust assembly described above.

In order to achieve the embodiment of the present disclosure provides an exhaust assembly, including: an exhaust system can be opened and closed; an exhaust trigger member connected to the exhaust system and adapted to trigger the exhaust system to open; a reset trigger member connected to the exhaust system and adapted to trigger the exhaust system to close; and a toggle member adapted to move between an exhaust position and a closing position, and when in the exhaust position, the toggle member acts on the exhaust trigger member and causes the exhaust trigger member to trigger the exhaust system to open, and when in the closing position, the toggle member acts on the reset trigger member and causes the reset trigger member to trigger the exhaust system to close.

In the exhaust assembly provided by the above embodiment of the present disclosure, the opening or closing of the exhaust system is controlled by a toggle member. Compared with the structure in the prior art in which multiple buttons are provided to control exhaust or closing separately, this structure enables the operation mode to change from the traditional pressing operation to a toggle operation due to the set of the toggle member, which leads to better operation experience and requires less labor. Moreover, the toggle operation enables more accurate and intuitive reflection of the operation stroke, which helps to ensure that the exhaust system is accurately triggered by the reset trigger member or the exhaust trigger member. This can prevent the problem of incomplete opening or closing of the exhaust system due to incomplete pressing, as compared with the button mode, and enables the opening/closing control of the exhaust system to be more accurate and reliable. Furthermore, a two-way control operation of opening and closing can be realized by using a single toggle member, which reduces the number of control keys on the operation interface while ensuring the control function of the product. Therefore, it is more conducive to the concise and intuitive design of the operation interface, improving the appearance quality of the product and reducing the probability of improper operation.

In addition, the exhaust assembly in the above embodiment provided by the present disclosure may also have the following additional embodiments.

In the above embodiment, the exhaust system includes: an exhaust apparatus, the toggle member causing, when in the exhaust position, the exhaust trigger member to trigger the exhaust apparatus to open; and a self-locking member, adapted to the exhaust trigger member and the reset trigger member, and the self-locking member is configured to be in a limiting fit with the exhaust trigger member to maintain the exhaust apparatus open, and when triggered by the reset trigger member, the self-locking member is released from the limiting fit with the exhaust trigger member.

In this embodiment, when the toggle member is toggled to the exhaust position, the toggle member acts on the exhaust trigger member, so that the exhaust trigger member is driven by the toggle member to trigger the exhaust apparatus to open. At this time, the self-locking member is in a limiting fit with the exhaust trigger member and locks the exhaust trigger member in the current position (i.e., the exhaust trigger member is maintained, by the self-locking member, in a position where the exhaust trigger member can trigger the exhaust apparatus to open). In this way, the opening of the exhaust apparatus is maintained by self-locking of the exhaust trigger member, without the need for the user to maintain the toggle member in the exhaust position all the time, i.e., if the user wants to open the exhaust apparatus, he only needs to toggle the toggle member to the exhaust position, which is simple, convenient and labor-saving in use and operation.

In a state where the exhaust apparatus is opened, when the toggle member is toggled to the closing position, the toggle member acts on the reset trigger member, so that under the driving of the toggle member, the reset trigger member triggers the self-locking member to cause the self-locking member to release the limiting on the exhaust trigger member. At this time, the exhaust trigger member cannot maintain triggering the exhaust apparatus to open, so that the exhaust apparatus can be closed for reset (for details, reference may be made to the cases where an exhaust valve is automatically closed by falling under gravity, where a sealing member springs back to cause a lever to drive the exhaust valve to close, or the like), realizing the function of the reset trigger member to trigger the exhaust system to close. Moreover, in such a structure, the exhaust apparatus is maintained open by limiting the exhaust trigger member. Accordingly, the reset state of the exhaust apparatus (i.e., a stage where the exhaust apparatus is not triggered by the exhaust trigger member to open) can be designed as the closed state, so that the exhaust apparatus remains closed when not triggered by the exhaust trigger member, i.e., the exhaust apparatus is made normally closed, then there is no need for the user to maintain the toggle member in the closing position all the time. That is, if the user intends to close the exhaust system, only a one-time toggle operation of toggling the toggle member to the closing position is required, and there is no need to maintain the toggle member in the closing position, which is simple, convenient and labor-saving in use and operation.

In any of the above embodiments, the self-locking member includes: an exhaust slider adapted to slide between a first position and a second position and configured to be in a limiting fit with the exhaust trigger member when in the first position; and a slider elastic member connected to the exhaust slider, and when in the second position, the exhaust slider is released from the limiting fit with the exhaust trigger member and causes the slider elastic member to be compressed, and elastic restoring of the slider elastic member causes the exhaust slider to reach the first position.

In this embodiment, an elastic fit can be formed between the exhaust slider and the exhaust trigger member by energy storing and energy releasing of the slider elastic member. In this way, the switching from forming a limiting fit to releasing the limiting fit between the exhaust slider and the exhaust trigger member is smoother, with less damage, and the exhaust slider can also be elastically maintained in the first position by using the slider elastic member, so that the limiting effect of the exhaust slider on the exhaust trigger member is more stable and reliable, enabling the product to have better effect in maintaining the exhaust system open.

In any of the above embodiments, the self-locking member is provided with a first engagement portion, and the exhaust trigger member is provided with a second engagement portion, and the first engagement portion and the second engagement portion can be engaged to lock the exhaust trigger member, when the toggle member acts on the exhaust trigger member in the exhaust position, the exhaust trigger member moves downwardly to cause the second engagement portion to be engaged with the first engagement portion, and the exhaust trigger member maintains the exhaust apparatus in an opened state; and when the self-locking member is triggered by the reset trigger member, the second engagement portion is disengaged from the first engagement portion so that limiting is released between the self-locking member and the exhaust trigger member.

In this embodiment, it is arranged that the self-locking member and the exhaust trigger member form a limiting fit by being engaged with each other and are released from the limiting fit by being disengaged with each other, which has the advantages of simple structure, convenient switching, and reliable and stable limiting.

In any of the above embodiments, the exhaust trigger member and the reset trigger member are arranged side by side, and the toggle member includes: a sliding portion adapted to slide between the exhaust position and the closing position; and a protruding portion provided on the sliding portion, and when in the exhaust position, the toggle member causes the protruding portion to press the exhaust trigger member and avoid the reset trigger member, and when in the closing position, the toggle member causes the protruding portion to press the reset trigger member.

In this embodiment, the user only needs to move the sliding portion to the exhaust position or the closing position to correspondingly control the exhaust system to open or close, which has the advantages of simple structure and convenient and labor-saving operation. Moreover, the protruding portion is designed to move along with the sliding portion to realize pressing the exhaust trigger member or the reset trigger member in the corresponding position. In this way, it is possible to ensure that the actions between the exhaust trigger member and the reset trigger member do not affect and interfere with each other, while realizing the opening/closing control of the exhaust system, leading to more accurate control over the opening and closing of the exhaust system.

In any of the above embodiments, when in an intermediate position between the exhaust position and the closing position, the toggle member causes the protruding portion to avoid the reset trigger member and the exhaust trigger member.

It will be appreciated that the intermediate position may be a middle position between the exhaust position and the closing position, although the intermediate position may also be designed between the exhaust position and the middle position, or between the closing position and the middle position.

In this embodiment, it is designed that when the toggle member is in the intermediate position, the protruding portion avoids the reset trigger member and the exhaust trigger member, that is, in such a case, the protruding portion will neither press the reset trigger member nor press the exhaust trigger member. In this way, after toggling the toggle member to the exhaust position to cause the exhaust trigger member to trigger the exhaust apparatus to open for exhaust, and limiting the exhaust trigger member by the self-locking member to maintain the exhaust apparatus open, it is possible to realize that the toggle member is returned to the intermediate position for reset without affecting the exhaust condition, and the movement of the exhaust trigger member leaving from triggering the exhaust system will not be restricted and disturbed by the protruding portion, then when the exhaust system of the product needs to be closed, in addition to toggling the toggle member to the closing position, other ways may be employed to control the exhaust system to be closed. This allows the product to control the closing of the exhaust system in a manner that is not restricted to the manner of toggling the toggle member to the closing position, which is beneficial to improving the control function of the product.

In any of the above embodiments, the exhaust assembly further includes: a first reset elastic member connected to the toggle member and adapted to drive the toggle member to move in a direction close to the closing position, and a second reset elastic member connected to the toggle member and adapted to drive the toggle member to move in a direction close to the exhaust position.

In this embodiment, a first reset elastic member and a second reset elastic member are provided. When the user drives the toggle member to the closing position, the second reset elastic member is compressed, and after the force applied to the toggle member by the user is removed, the second reset elastic member is elastically restored, which may cause the toggle member to automatically leave the closing position and cause the toggle member to approach the intermediate position for restoring. In addition, when the user drives the toggle member to the exhaust position, the first reset elastic member is compressed, and after the force applied to the toggle member by the user is removed, the first reset elastic member is elastically restored, which may cause the toggle member to automatically leave the exhaust position and cause the toggle member to approach the intermediate position for restoring. In this way, by the coordination between the first reset elastic member and the second reset elastic member, the toggle member can always be automatically maintained in the intermediate position, so that the operation stroke of the user controlling the toggle member to exhaust or close is shorter, and the operation is easier.

In any of the above embodiments, the protruding portion is configured with an abutment surface, and the reset trigger member and the exhaust trigger member are each configured with a mating surface for abutting against the abutment surface, and at least one of the mating surface and the abutment surface is an inclined surface.

In this embodiment, it is arranged that at least one of the mating surface and the abutment surface is an inclined surface. In this way, by using the inclined surface, the action force of the toggle member in the sliding direction can be well converted into a pressing force suitable for pressing the exhaust trigger member or the reset trigger member, making the operation more labor-saving, while achieving the purpose of controlling the opening and closing of the exhaust system.

In any of the above embodiments, at least one of the reset trigger member and the exhaust trigger member includes a push rod and a push rod elastic member, the push rod elastic member is connected to the push rod, and when the toggle member acts on the push rod, the push rod triggers the exhaust system and compresses the push rod elastic member, and elastic restoring of the push rod elastic member causes the push rod to stop triggering the exhaust system.

In this embodiment, it is arranged that the reset trigger member includes a push rod and a push rod elastic member, and/or the exhaust trigger member specifically includes a push rod and a push rod elastic member. In this way, by using the push rod elastic member for energy storing and energy releasing, after the action force exerted by the protruding portion on the reset trigger member or the exhaust trigger member is removed, the reset trigger member or the exhaust trigger member itself can spring back to reset quickly, so that the cooperative response between the reset trigger member or the exhaust trigger member and the exhaust system is more accurate, thus improving the accuracy of the opening/closing control of the exhaust system.

In any of the above embodiments, the exhaust assembly further includes: a pressing plate for connecting with an upper cover, and the push rod is provided with a stopping edge, the push rod passes through the pressing plate, the stopping edge is spaced apart from the pressing plate, the push rod elastic member abuts against the pressing plate and the stopping edge, and the push rod is movable relative to the pressing plate to cause the stopping edge and the pressing plate to move close to each other to compress the push rod elastic member, or to cause the stopping edge and the pressing plate to move away from each other to release the push rod elastic member.

In this embodiment, the push rod passes through the pressing plate, and by using the penetration fit between the pressing plate and the push rod, the pressing plate can effectively guide the push rod to realize radial limiting of the push rod, so that the cooperation between the toggle member and the push rod is more accurate and reliable, and by means of the pressing plate, the push rod and the push rod elastic member can be locked to the upper cover to realize assembly, which has the advantages of simple structure, convenient assembly and high efficiency.

In any of the above embodiments, the exhaust apparatus includes an exhaust valve, and a lever mechanism including two moment arms, and one of the moment arms is connected to the exhaust valve, the exhaust trigger member abuts against and acting on the other moment arm to cause the one moment arm to be tilted up to jack up the exhaust valve, or the exhaust trigger member abuts against and acting on the other moment arm to cause the one moment arm to be pressed down to drop the exhaust valve.

In this embodiment, the exhaust trigger member controls the opening or closing of the exhaust valve by means of the lever mechanism, which on the one hand is more conducive to the design of the spatial layout between product components, and on the other hand enables more precise control of the compatibility between the magnitude of the output force of the exhaust trigger member and the magnitude of the input force of the exhaust valve by the lever mechanism, and the compatibility between the trigger stroke length of the exhaust trigger member and the action stroke length of the exhaust valve, improving the accuracy of the opening/closing control of the exhaust system.

In any of the above embodiments, a sealing member is provided between the one moment arm of the lever mechanism and the exhaust valve, the sealing member is provided with a connecting opening and an elastic portion, the one moment arm of the lever mechanism passes through the connecting opening, and the elastic portion is compressed when the exhaust trigger member triggers the exhaust valve to open, and elastic restoring of the elastic portion causes the exhaust valve to be closed.

In this embodiment, a sealing member is provided between the lever mechanism and the exhaust valve, which can reduce the leakage from the exhaust valve to the other portions of the exhaust assembly, thus ensuring the cleanness of the product, while avoiding the problem of corrosion by steam.

The elastic portion of the sealing member is arranged to elastically restore to drive the moment arm to swing to cause the exhaust valve to close, making the reset closing of the exhaust valve more reliable. Moreover, the sealing member can integrate sealing and driving functions, which can make the product parts multi-purpose, reducing the quantity of product parts and reducing the cost.

In any of the above embodiments, the exhaust assembly further includes: an upper cover self-locking apparatus, including a self-locking slider adapted to slide between a self-locking position and an unlocking position, the self-locking slider causing the upper cover and a pot body to be locked when in the self-locking position, and causing the upper cover and a pot body to be unlocked when in the unlocking position, and the self-locking member is connected to the self-locking slider and slides with the self-locking slider, and when sliding from the self-locking position to the unlocking position, the self-locking slider drives the self-locking member and the exhaust trigger member to be released from the limiting fit.

In this embodiment, the self-locking slider of the upper cover self-locking apparatus is connected with the self-locking member, and while controlling the upper cover and the pot body to be locked, the self-locking slider of the upper cover self-locking apparatus drives the self-locking member to release the limiting effect on the exhaust trigger member. Since the exhaust trigger member cannot maintain triggering opening of the exhaust apparatus after the self-locking member releases the limiting effect on the exhaust trigger member, the exhaust apparatus can be closed to realize reset at this time, realizing that the upper cover self-locking apparatus controls the exhaust system to close while locking the cover, and preventing the problem of a failure in pressure rising in the pot due to forgetting to close the exhaust system manually after manually controlling the exhaust system to exhaust via the toggle member.

In addition, while the self-locking slider slides to control the upper cover to be locked with the pot body, the self-locking member is driven to slide to correspondingly control the exhaust system to close. By the design of double sliders, the advantages of simple structure and high control precision can be realized.

In any of the above embodiments, the exhaust slider of the self-locking member is provided with support ribs configured to contact a pot cover in the upper cover and support the exhaust slider on the pot cover.

In this embodiment, support ribs are arranged on the exhaust slider for supporting the exhaust slider on the pot cover, so that the exhaust slider can be installed on the pot cover and slide along the pot cover, which is more conducive to ensuring the sliding stability of the exhaust slider. Moreover, by supporting the exhaust slider with the support ribs, the purpose of bearing the exhaust slider by the pot cover is realized, and at the same time, the contact area of the exhaust slider with the pot cover is reduced, so that the sliding friction of the exhaust slider is reduced, which is more advantageous to ensuring the sliding smoothness and response precision of the exhaust slider.

In any of the above embodiments, the exhaust slider is located above the self-locking slider, the support ribs are distributed on both sides of the self-locking slider; or the exhaust slider is located above the self-locking slider, the exhaust slider is provided with two lower extending portions that are opposite to and spaced apart from each other, a portion of the self-locking slider is located between the two lower extending portions, and the support rib is provided at the bottom of the lower extending portion.

In this embodiment, the support ribs are located on both sides of the self-locking slider, so that the self-locking slider is limited between the support ribs on both sides, thus improving the positioning, limiting and guiding effects on the self-locking slider. Moreover, the exhaust slider is installed on the pot cover in a covering manner, and the exhaust slider and the pot cover can limit the self-locking slider in the up-down direction, limiting the self-locking slider in the up-down direction and the left-right direction, and improving the assembly stability of the self-locking slider.

The two lower extending portions are located on both sides of the self-locking slider, so that the self-locking slider is limited between the two lower extending portions, thus improving the positioning, limiting and guiding effects on the self-locking slider. Moreover, the exhaust slider is installed on the pot cover in a covering manner, and the exhaust slider and the pot cover can limit the self-locking slider in the up-down direction, limiting the self-locking slider in the up-down direction and the left-right direction, and improving the assembly stability of the self-locking slider.

In any of the above embodiments, there is a release position for the sliding movement of the exhaust slider of the self-locking member, when in the release position, the exhaust slider releases the exhaust system to close, and the exhaust slider is provided with a slideway; the self-locking slider is at least partially located in the slideway, the self-locking slider and the exhaust slider are in a transmission connection, and the self-locking slider is configured to slide along the slideway during rotation of the upper cover relative to the pot body, and drive the exhaust slider so that the exhaust slider reaches the release position.

In this embodiment, when the upper cover rotates relative to the pot body for closing, the self-locking slider can be driven to slide. The self-locking slider is in a transmission connection with the exhaust slider, so that during sliding, the self-locking slider can drive the exhaust slider and can drive the exhaust slider to the release position, automatically controlling the exhaust system to close while realizing that the upper cover rotates to be closed, thus effectively solving the problem that the pressure cannot be normally increased in the pot due to the user's forgetting to manually reset the exhaust system to close the exhaust system. Moreover, in this structure, the design of disposing a slideway on the exhaust slider and slidably assembling the self-locking slider in the slideway enables a more stable matching and a higher matching precision between the exhaust slider and the self-locking slider, which improves the precision of driving control of the exhaust slider and ensures that the exhaust system is closed accurately as the upper cover rotates to be closed.

In any of the above embodiments, the exhaust slider is provided with a first stopping edge and a second stopping edge, the first stopping edge and the second stopping edge are opposite to and spaced apart from each other to define the slideway, and the self-locking slider is located between the first stopping edge and the second stopping edge.

In this embodiment, the first stopping edge and the second stopping edge are spaced apart to define the slideway, which has the advantages of simple structure and easy processing and manufacturing. Moreover, the self-locking slider and the exhaust slider are mutually limited, so that the transmission effect between the self-locking slider and the exhaust slider is better, and it is also ensured that the transmission fit between the self-locking slider and the exhaust slider is more stable and reliable, thus ensuring accurate linkage of the exhaust slider with the self-locking slider.

In any of the above embodiments, the exhaust slider is located above the self-locking slider, and the first stopping edge and the second stopping edge extend downwardly and are configured to abut against the upper cover.

In this embodiment, while the exhaust slider is installed on the upper cover downwardly in a covering manner, the self-locking slider can be limited between the upper cover and the exhaust slider, so that the assembly and positioning between the exhaust slider and the self-locking slider are more convenient, and the assembly precision is higher. In addition, an up-down limiting of the self-locking slider can be formed by this structure, so that the transmission fit between the self-locking slider and the exhaust slider is more stable and reliable, thus ensuring accurate linkage of the exhaust slider with the self-locking slider.

In any of the above embodiments, the self-locking slider is provided with a self-locking opening for insertion of a float, and the exhaust slider is provided with an escape opening facing the self-locking opening and used for avoiding the float.

In this embodiment, a self-locking opening is provided on the exhaust slider for avoiding a float, so that while forming a mutual limiting fit with the self-locking slider through the slideway, the exhaust slider is prevented from disturbing the normal self-locking function of the self-locking slider, ensuring that the self-locking function of the self-locking slider is accurate and reliable.

In any of the above embodiments, the self-locking slider is provided with a locking pin elastic member and a self-locking pin, during sliding, the self-locking slider presses or releases the locking pin elastic member, and the self-locking pin is configured for sliding engagement with pot teeth of the pot body, so that during the rotation of the upper cover relative to the pot body, the self-locking slider is triggered to slide, and the self-locking slider is provided with an abutment portion adjacent to the self-locking pin and configured to abut against the exhaust slider and the self-locking slider drives the exhaust slider to move in a direction close to the release position.

In this embodiment, the abutment portion is arranged adjacent to the self-locking pin, so that the moment arm formed when the abutment portion abuts against the exhaust slider is relatively short, which can reduce the torque applied to the self-locking slider and ensure the sliding smoothness of the self-locking slider, so that the transmission between the self-locking slider and the exhaust slider is more stable, and the linkage is more reliable and accurate. Moreover, the matching straightness between the self-locking pin and a pin hole on the upper cover is better, the self-locking pin is not easy to be stuck, and the opening and closing of the cover are smoother. And this can also reduce the risk of deformation of the self-locking slider and improve the quality of the product.

In any of the above embodiments, the self-locking slider includes a slider body and a connecting plate, the slider body is provided with a self-locking opening, one end of the connecting plate is connected to the slider body and the other end of the connecting plate is provided with the self-locking pin and the locking pin elastic member, and the connecting plate is provided with the abutment portion.

In this embodiment, the abutment portion, the self-locking pin and the locking pin elastic member are all arranged on the connecting plate, so that the moment arm formed on the self-locking slider is relatively short, which helps to reduce the torque received by the self-locking slider, and ensures the sliding smoothness of the self-locking slider, so that the transmission between the self-locking slider and the exhaust slider is more stable, and the linkage is more reliable and accurate. Moreover, the matching straightness between the self-locking pin and the pin hole on the upper cover is better, the self-locking pin is not easy to be stuck, and the opening and closing of the cover are smoother. And this can also reduce the risk of deformation of the self-locking slider and improve the quality of the product. In addition, this design also enables the bearing part of the self-locking slider to avoid the self-locking opening, which helps to ensure the matching effect between the self-locking opening and the float, and improve the reliability of the self-locking function.

In any of the above embodiments, the abutment portion includes a bulge structure.

In this embodiment, the abutment portion is arranged to include a bulge structure formed on the self-locking slider, so that the self-locking slider is stiffened in the part for abutment with the exhaust slider, reducing the risk of deformation of the self-locking slider, and making the matching precision between the self-locking slider and the exhaust apparatus higher.

In any of the above embodiments, the exhaust slider is adapted to slide between the self-locking position and the release position, and the exhaust slider is separated from the abutment portion when in the self-locking position.

In this embodiment, the exhaust slider is arranged to be separated from the abutment portion when in the self-locking position. In this way, when there is no necessity to drive the exhaust slider, the self-locking slider is substantially unaffected by the action force from the exhaust slider, ensuring that the self-locking function of the self-locking slider is realized accurately.

In any of the above embodiments, a control apparatus includes the exhaust trigger member and the reset trigger member, and the exhaust slider and the self-locking slider are located on the same side of the control apparatus and slide relative to the control apparatus to approach or move away from the control apparatus.

In this embodiment, the exhaust slider and the self-locking slider are integrated on the same side of the control apparatus, the sliding of the exhaust slider is formed as a movement close to or away from the control apparatus, and the sliding of the self-locking slider is formed as a movement close to or away from the control apparatus. In this way, the product has better space integration, there is no need to provide more space for the sliding installation of the self-locking slider and the exhaust slider, and the product has a more compact structure.

In any of the above embodiments, the exhaust slider is provided with a stopper portion configured to abut against the upper cover when the exhaust slider is in the self-locking position, to limit continued movement of the exhaust slider in a direction away from the release position.

In this embodiment, a stopper portion is provided on the exhaust slider for abutting against the upper cover for limiting when the exhaust slider reaches the self-locking position, which helps the exhaust slider to maintain stable in the self-locking position, so that the exhaust slider can accurately and effectively maintain the opening of the exhaust system. Moreover, by limiting the exhaust slider, it is possible to prevent the action force of the exhaust slider from being further applied to the self-locking slider. In this way, when there is no necessity to drive the exhaust slider, the self-locking slider is substantially unaffected by the action force from the exhaust slider, thus ensuring that the self-locking function of the self-locking slider is realized accurately.

In any of the above embodiments, the exhaust assembly further includes: a cover rotation trigger mechanism, the self-locking member connecting with the cover rotation trigger mechanism and moving along with the cover rotation trigger mechanism, the self-locking member being provided with a trigger portion, and the cover rotation trigger mechanism is configured to detect a position of the upper cover relative to the pot body, and cause the trigger portion to act on the exhaust apparatus and trigger the exhaust apparatus to open, when the upper cover is in an unscrewed position relative to the pot body, and cause the trigger portion to leave the exhaust apparatus, when the upper cover is in a screwed position relative to the pot body.

In this embodiment, a cover rotation trigger mechanism is provided, and the cover rotation trigger mechanism is made to drive the self-locking member to trigger the exhaust apparatus to open, when the upper cover is in the unscrewed position relative to the pot body (i.e., the upper cover is in the position where cover teeth of the upper cover are disengaged with the pot teeth of the pot body). In this way, when the upper cover is closed on the pot body in a hot state in the unscrewed position, the problem of unsmooth closing will not occur. In addition, the cover rotation trigger mechanism is made to cause the trigger portion to leave the exhaust apparatus, when the upper cover is in the screwed position relative to the pot body (i.e., the upper cover is in the position where the cover teeth of the upper cover are opposite to the pot teeth of the pot body). At this time, the trigger portion no longer triggers the exhaust apparatus to open, so that the exhaust apparatus can be closed smoothly to facilitate pressure rising in the pot.

In any of the above embodiments, the cover rotation trigger mechanism includes: a floating member for connecting with the upper cover, the floating member being in a transmission connection with the self-locking member, and floating of the floating member drives the self-locking member to move; an elastic support member for supporting the floating member; and an adaptation portion for connecting with the pot body and abutting against the floating member, and a guide inclined surface is configured between the adaptation portion and the floating member, during the rotation of the upper cover relative to the pot body, the floating member mates with the adaptation portion, the adaptation portion pushes the floating member, and the floating member drives the self-locking member to move to cause the trigger portion of the self-locking member to act on the exhaust apparatus.

In this embodiment, by means of the floating member, during the rotation of the upper cover relative to the pot body, the floating member can be caused to move along the guide inclined surface to produce rising and lowering movement, to further drive the self-locking member to slide. In this way, by sliding, the self-locking member can correspondingly trigger the exhaust apparatus to open, or leave the exhaust apparatus to stop triggering the exhaust apparatus to open, to achieve the object of control. Moreover, the double slider design of the floating member and the self-locking member further provides the advantages of simple structure and high control precision.

An embodiment of the present disclosure provides an upper cover assembly, including: an upper cover; and the exhaust assembly according to any of the above embodiments, disposed on the upper cover.

The upper cover assembly provided by the above embodiment of the present disclosure is provided with the exhaust assembly in any of the above embodiments, and therefore has all the above beneficial effects, which are not described in detail herein.

An embodiment of the present disclosure provides a cooking device, including the exhaust assembly in any of the above embodiments.

The cooking device provided by the above embodiment of the present disclosure is provided with the exhaust assembly in any of the above embodiments, and therefore has all the above beneficial effects, which are not described in detail herein.

In one embodiment, the cooking device is an electric pressure cooker, a pressure rice cooker, an air fryer, a steam oven, etc.

BRIEF DESCRIPTION OF THE DRAWINGS

The description of embodiments in conjunction with the following drawings.

The corresponding relationship between the reference signs and component names in FIG. 1 to FIG. 21 is as follows:

101 exhaust assembly, 100 exhaust system, 110 exhaust apparatus, 111 exhaust valve, 1111 valve body, 1112 valve core, 112 lever mechanism, 1121 lever, 11211 (A/B) moment arm, 1122 screw, 120 sealing member, 121 connecting opening, 122 elastic portion, 130 self-locking member, 131 exhaust slider, 1311 first engagement portion, 132 slider elastic member, 133 second inclined wall surface, 134 trigger portion, 135 extending rib, 136 support rib, 137 lower extending portion, 138 slideway, 1381 first stopping edge, 1382 second stopping edge, 139 escape opening, 140 stopper portion, C control apparatus, 200 exhaust trigger member, 210 exhaust push rod, 211 exhaust mating surface, 212 exhaust stopping edge, 213 second engagement portion, 220 exhaust push rod elastic member, 300 reset trigger member, 310 reset push rod, 311 reset mating surface, 312 reset stopping edge, 320 reset push rod elastic member, 400 toggle member, 410 sliding portion, 411 baffle, 412 protruding post, 420 protruding portion, 421 abutment surface, 431 first reset elastic member, 432 second reset elastic member, 500 upper cover self-locking apparatus, 510 self-locking slider, 520 self-locking pin, 530 locking pin elastic member, 540 locking opening, 550 abutment portion, 561 slider body, 562 connecting plate, 600 cover rotation trigger mechanism, 610 floating member, 611 first inclined wall surface, 6111 stopper protrusion, 612 ejector rod, 620 elastic support member, 630 adaptation portion, 631 guide inclined surface, 710 pressing plate, 10 upper cover assembly, 102 upper cover, 1021 pot cover, 1022 face cover, 1023 handle, 1 cooking device, 20 pot body, 21 pot tooth, 22 housing cover, 23 outer pot, 30 inner pot.

DETAILED DESCRIPTION OF THE DISCLOSURE

In order that the above-mentioned embodiments of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

An exhaust assembly, an upper cover assembly and a cooking device according to some embodiments of the present disclosure are described below with reference to FIG. 1 to FIG. 21.

Figure 1:
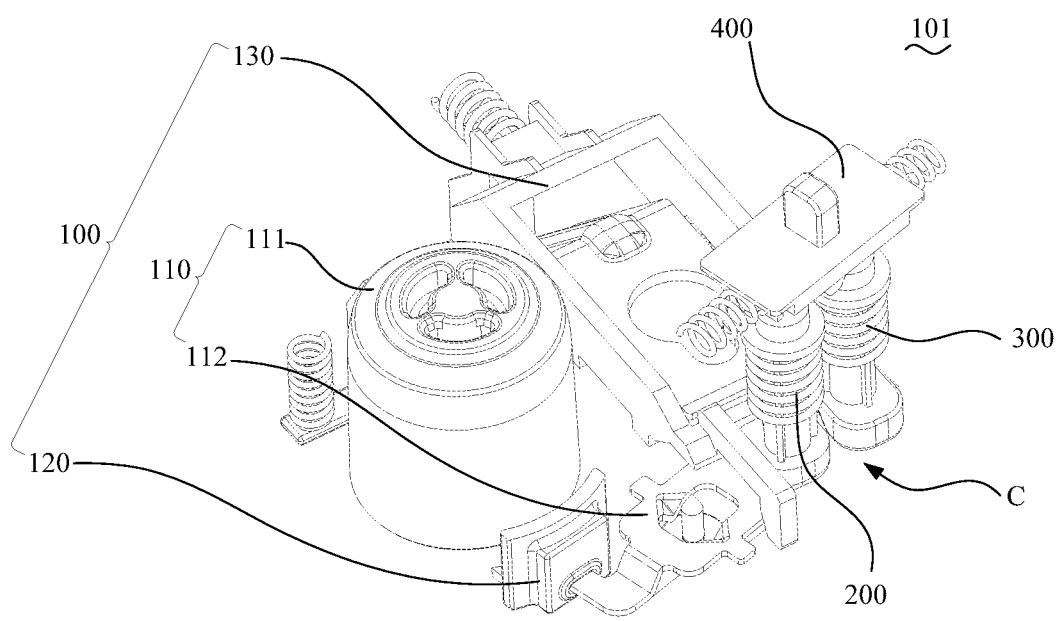
FIG. 1 is a schematic structural view of an exhaust assembly according to an embodiment of the present disclosure.

As shown in FIG. 1, an exhaust assembly 101 provided by an embodiment of the present disclosure, used for a cooking device 1, includes: an exhaust system 100, an exhaust trigger member 200, a reset trigger member 300 and a toggle member 400.

In one embodiment, the exhaust system 100 is configured to be openable and closable. It can be understood that the exhaust system 100 is a structure for exhaust of a cooking chamber of the cooking device 1, and opening the exhaust system 100 can provide a passage for exhaust of the cooking chamber, and closing the exhaust system 100 causes the passage for exhaust of the cooking chamber to be closed.

The exhaust trigger member 200 is connected with the exhaust system 100 and is adapted to trigger the exhaust system 100 to open. The reset trigger member 300 is connected with the exhaust system 100 and is adapted to trigger the exhaust system 100 to close. The toggle member 400 is adapted to move between an exhaust position and a closing position. When in the exhaust position, the toggle member 400 acts on the exhaust trigger member 200 and causes the exhaust trigger member 200 to trigger the exhaust system 100 to open; and when in the closing position, the toggle member 400 acts on the reset trigger member 300 and causes the reset trigger member 300 to trigger the exhaust system 100 to close.

In the exhaust assembly 101 provided by the above embodiment of the present disclosure, the opening or closing of the exhaust system 100 is controlled by a toggle member 400. Compared with the structure in the prior art in which multiple buttons are provided to control exhaust or closing separately, this structure enables the operation mode to change from the traditional pressing operation to a toggle operation due to the set of the toggle member 400, which leads to better operation experience and requires less labor. Moreover, the toggle operation enables more accurate and intuitive reflection of the operation stroke, which helps to ensure that the exhaust system 100 is accurately triggered by the reset trigger member 300 or the exhaust trigger member 200. This can prevent the problem of incomplete opening or closing of the exhaust system 100 due to incomplete pressing, as compared with the button mode, and enables the opening/closing control of the exhaust system 100 to be more accurate and reliable. Furthermore, a two-way control operation of opening and closing can be realized by using a single toggle member 400, which reduces the number of control keys on the operation interface while ensuring the control function of the product. Therefore, it is more conducive to the concise and intuitive design of the operation interface, improving the appearance quality of the product and reducing the probability of improper operation.

Embodiment I

In addition to the features in the above embodiments, as shown in FIG. 1, it is further defined in this embodiment that the exhaust system 100 includes an exhaust apparatus 110 and a self-locking member 130.

In one embodiment, when in the opened state, the exhaust apparatus 110 is used for exhaust of the cooking chamber, and the toggle member 400 causes, when in the exhaust position, the exhaust trigger member 200 to trigger the exhaust apparatus 110 to open.

Figure 4:
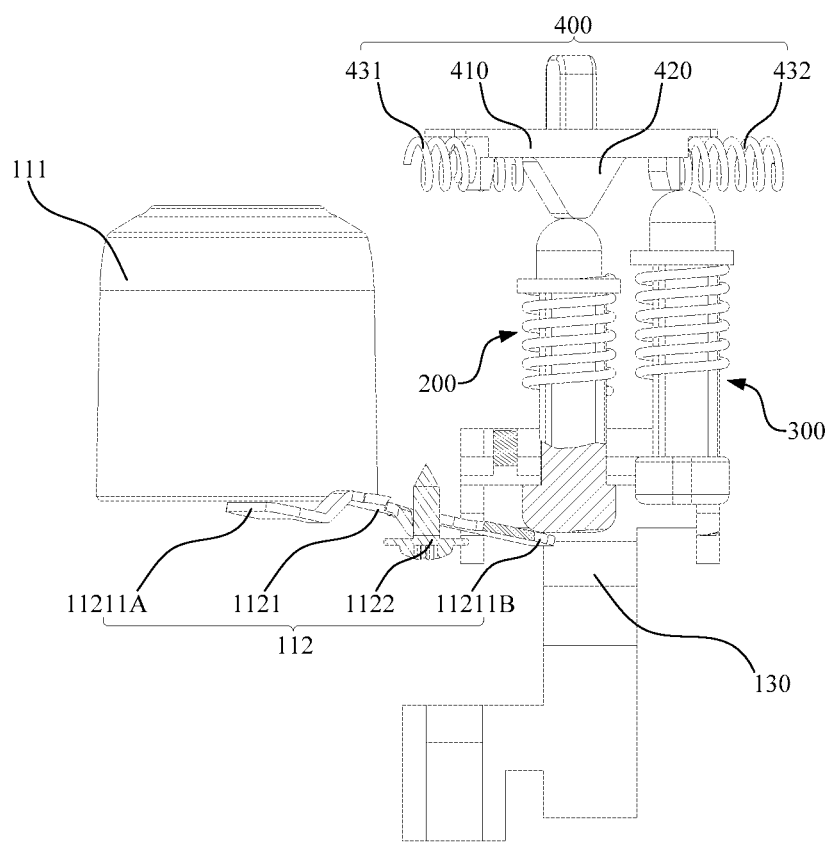
FIG. 4 is a partial sectional structural view of the exhaust assembly in a second state according to an embodiment of the present disclosure.
Figure 5:
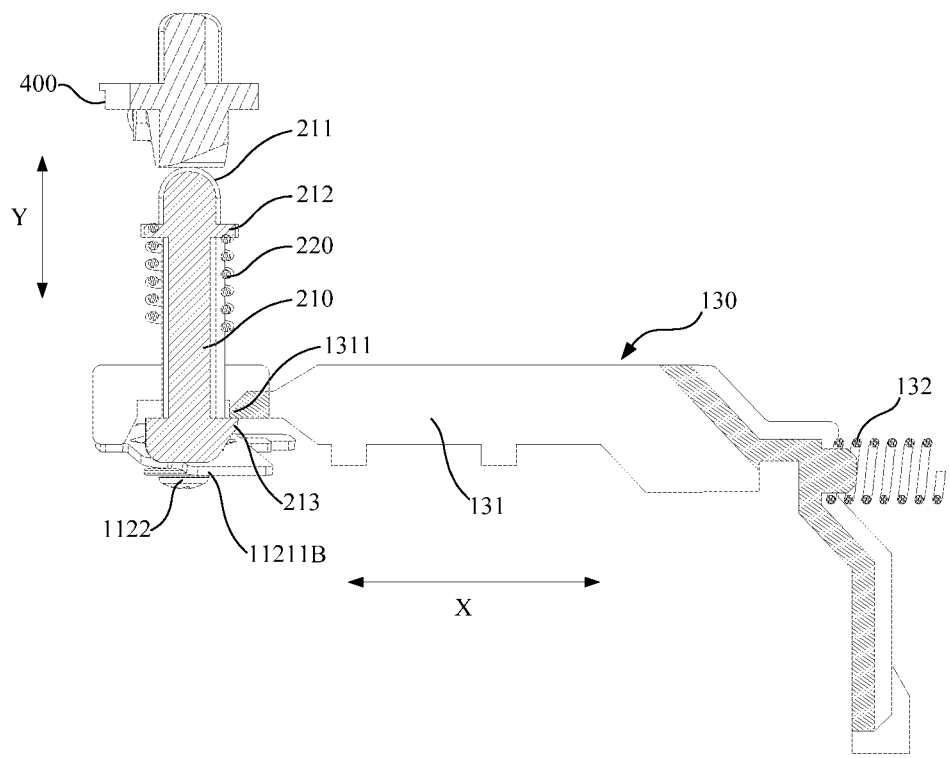
FIG. 5 is another schematic sectional structural view of the exhaust assembly shown in FIG. 4.

In one embodiment, as shown in FIGS. 4 and 5, the state of the exhaust assembly 101 shown in FIGS. 4 and 5 is an exhaust state in which the exhaust trigger member 200 triggers the exhaust apparatus 110 to open.

Figure 2:
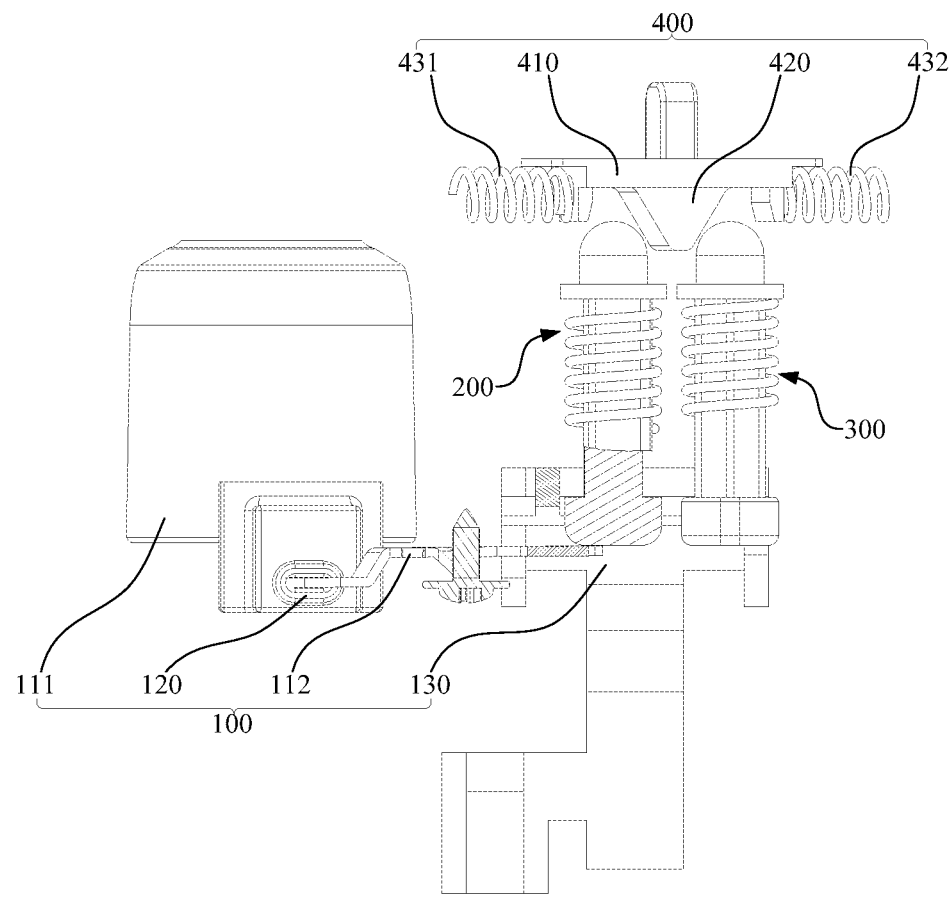
FIG. 2 is a partial sectional structural view of the exhaust assembly in a first state according to an embodiment of the present disclosure.
Figure 3:
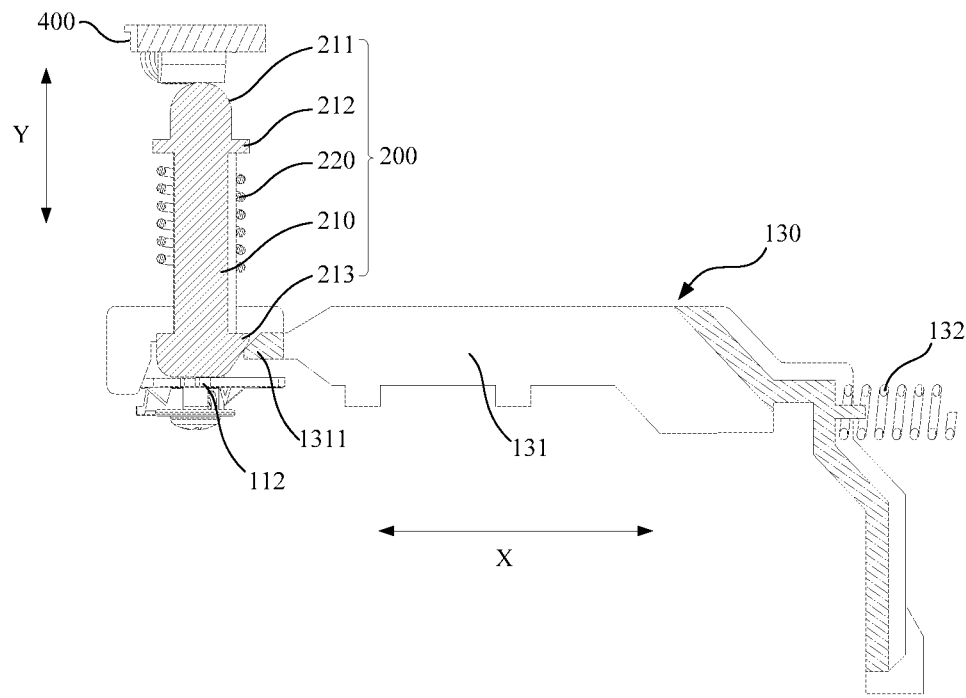
FIG. 3 is another schematic sectional structural view of the exhaust assembly shown in FIG. 2.

In one embodiment, as shown in FIGS. 2 and 3, the state of the exhaust assembly 101 shown in FIGS. 2 and 3 is an initial state in which the exhaust apparatus 110 is not triggered by the exhaust trigger member 200, and in this state, the exhaust apparatus 110 is closed.

In addition, the self-locking member 130 is adapted to mate with the exhaust trigger member 200 or the reset trigger member 300. In one embodiment, the self-locking member 130 is configured to be in a limiting fit with the exhaust trigger member 200 to maintain the exhaust apparatus 110 open, and when triggered by the reset trigger member 300, the self-locking member 130 is released from the limiting fit with the exhaust trigger member 200.

In one embodiment, as shown in FIGS. 4 and 5, the state of the exhaust assembly 101 shown in FIGS. 4 and 5 is the exhaust state in which the exhaust trigger member 200 triggers the exhaust apparatus 110 to open. At this time, the self-locking member 130 is in a limiting fit with the exhaust trigger member 200, so that the exhaust trigger member 200 is maintained in a position where the exhaust trigger member 200 triggers the exhaust apparatus 110 to open, maintaining the exhaust apparatus 110 open.

Figure 6:
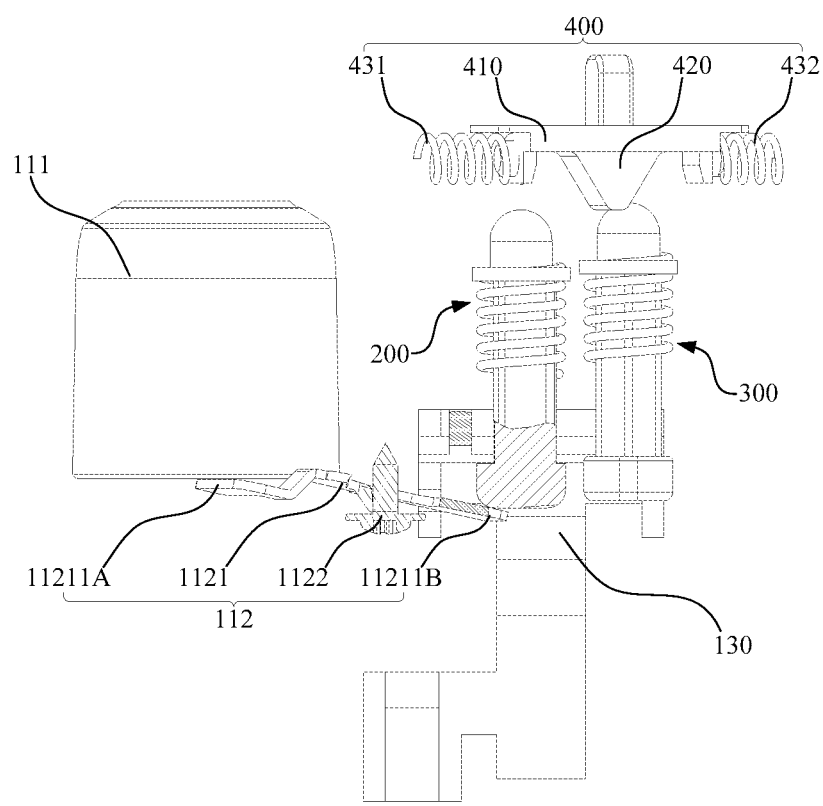
FIG. 6 is a partial sectional structural view of the exhaust assembly in a third state according to an embodiment of the present disclosure.
Figure 7:
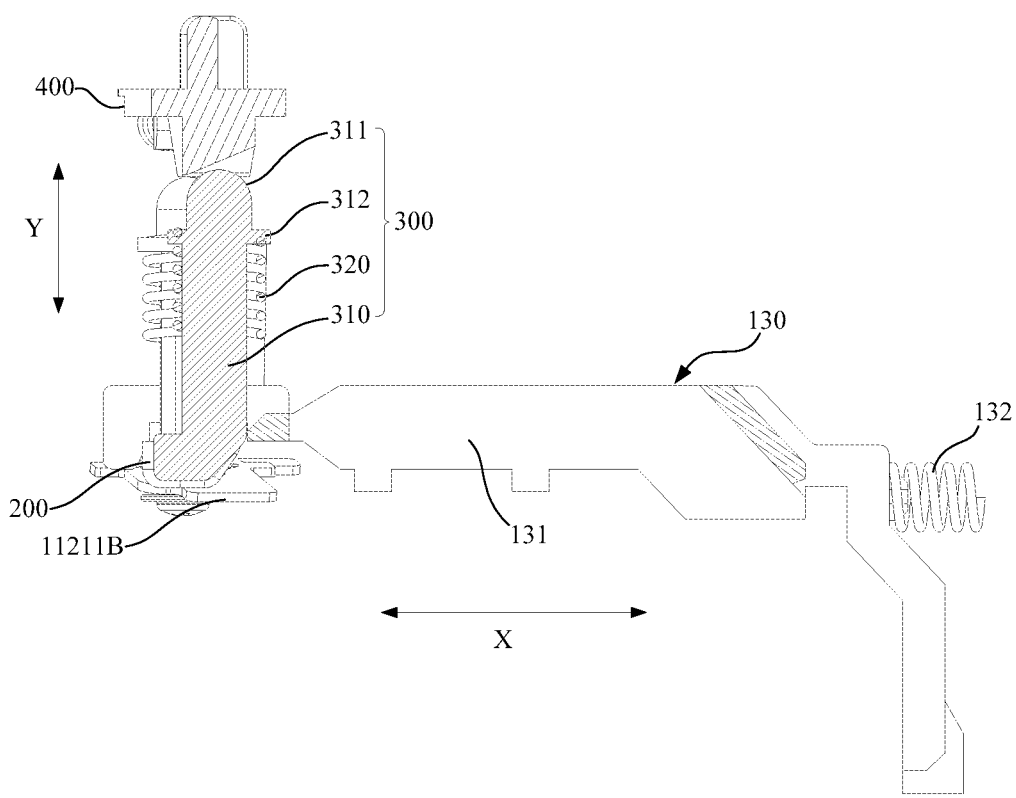
FIG. 7 is another schematic sectional structural view of the exhaust assembly shown in FIG. 5.
Figure 8:
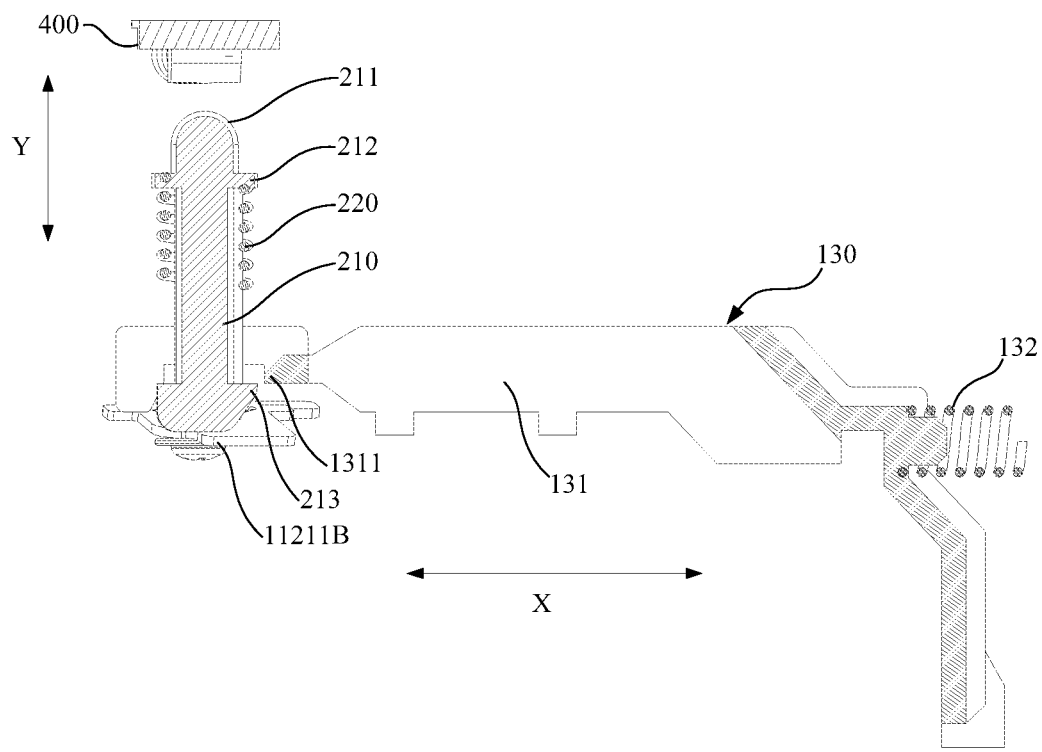
FIG. 8 is a further schematic sectional structural view of the exhaust assembly shown in FIG. 5.

In one embodiment, as shown in FIGS. 6 and 7, the state of the exhaust assembly 101 shown in FIGS. 6 and 7 is a reset state in which the reset trigger member 300 triggers the self-locking member 130 so that the self-locking member 130 and the exhaust trigger member 200 are released from the limiting fit (as shown in FIG. 8), then the exhaust trigger member 200 can leave the position where it triggers the exhaust apparatus 110 to open, so that the exhaust apparatus 110 is no longer triggered by the exhaust trigger member 200.

Moreover, it can be understood that the exhaust apparatus 110 is closed after the exhaust trigger member 200 stops triggering the exhaust apparatus 110, so that the exhaust assembly 101 is automatically switched from the reset state to the initial state, accomplishing the function of triggering the closing of the exhaust system 100 by controlling the reset trigger member 300.

In this embodiment, when the toggle member 400 is toggled to the exhaust position, the toggle member 400 acts on the exhaust trigger member 200, so that the exhaust trigger member 200 is driven by the toggle member 400 to trigger the exhaust apparatus 110 to open. At this time, the self-locking member 130 is in a limiting fit with the exhaust trigger member 200 and locks the exhaust trigger member 200 in the current position (i.e., the exhaust trigger member 200 is maintained, by the self-locking member 130, in a position where the exhaust trigger member 200 can trigger the exhaust apparatus 110 to open). In this way, the opening of the exhaust apparatus 110 is maintained by self-locking of the exhaust trigger member 200, without the need for the user to maintain the toggle member 400 in the exhaust position all the time, i.e., if the user wants to open the exhaust apparatus 110, he only needs to toggle the toggle member 400 to the exhaust position, which is simple, convenient and labor-saving in use and operation.

In a state where the exhaust apparatus 110 is opened, when the toggle member 400 is toggled to the closing position, the toggle member 400 acts on the reset trigger member 300, so that under the driving of the toggle member 400, the reset trigger member 300 triggers the self-locking member 130 to cause the self-locking member 130 to release the limiting on the exhaust trigger member 200. At this time, the exhaust trigger member 200 cannot maintain triggering the exhaust apparatus 110 to open, so that the exhaust apparatus 110 can be closed and reset (for details, reference may be made to the cases where an exhaust valve is automatically closed by falling under gravity, where a sealing member 120 springs back to cause a lever to drive the exhaust valve to close, or the like), realizing the function of the reset trigger member 300 to trigger the exhaust system 100 to close. Moreover, in such a structure, the exhaust apparatus 110 is maintained open by limiting the exhaust trigger member 200. Accordingly, the reset state of the exhaust apparatus 110 (i.e., a stage where the exhaust apparatus 110 is not triggered by the exhaust trigger member 200 to open) can be designed as the closed state, so that the exhaust apparatus 110 remains closed when not triggered by the exhaust trigger member 200, i.e., the exhaust apparatus 110 is made normally closed, then there is no need for the user to maintain the toggle member 400 in the closing position all the time. That is, if the user intends to close the exhaust system 100, only a one-time toggle operation of toggling the toggle member 400 to the closing position is required, and there is no need to maintain the toggle member 400 in the closing position, which is simple, convenient and labor-saving in use and operation.

Of course, the design is not limited to the example of Embodiment I. In other embodiments, the structural form may also be used in which the exhaust trigger member 200 acts on the exhaust apparatus 110 to trigger the exhaust apparatus 110 to open, and the reset trigger member 300 acts on the exhaust apparatus 110 in a reverse direction to trigger the exhaust apparatus 110 to close.

Embodiment II

In addition to the features of the above embodiments, as shown in FIGS. 3, 5, 7 and 8, it is further defined in this embodiment that the self-locking member 130 includes an exhaust slider 131 and a slider elastic member 132.

In one embodiment, the exhaust slider 131 is adapted to slide between a first position and a second position and configured to be in a limiting fit with the exhaust trigger member 200 when in the first position.

The slider elastic member 132 is connected to the exhaust slider 131, when in the second position, the exhaust slider 131 is released from the limiting fit with the exhaust trigger member 200 and causes the slider elastic member 132 to be compressed, and elastic restoring of the slider elastic member 132 causes the exhaust slider 131 to reach the first position.

In one embodiment, as shown in FIGS. 3, 5, 7 and 8, the exhaust slider 131 slides in the X direction between the first position and the second position. The slider elastic member 132 may be a spring, and of course, it may also be an elastic portion 122 such as an elastic piece or an elastic body. The slider elastic member 132 may expand and contract in the sliding direction of the exhaust slider 131.

As shown in FIGS. 4 and 5, in the exhaust state, the exhaust trigger member 200 triggers the exhaust apparatus 110 to open. At this time, the exhaust slider 131 is in the first position and is in a limiting fit with the exhaust trigger member 200 to limit the exhaust trigger member 200 in a position for triggering the exhaust apparatus 110 to open, maintaining the exhaust apparatus 110 open.

As shown in FIGS. 6 and 7, in the exhaust state and when the reset trigger member 300 triggers the exhaust slider 131, the reset trigger member 300 drives the exhaust slider 131 to slide in the X direction towards the side where the slider elastic member 132 is located, so that the slider elastic member 132 is compressed, and at the same time, the exhaust slider 131 is moved from the first position to the second position, which further enables the exhaust slider 131 and the exhaust trigger member 200 to be released from the limiting fit (as shown in FIG. 8). In this way, the exhaust apparatus 110 is no longer triggered by the exhaust trigger member 200, and the exhaust apparatus 110 is closed.

As shown in FIGS. 2 and 3, after the exhaust slider 131 and the exhaust trigger member 200 are released from the limiting fit, the exhaust slider 131 returns to the position where the exhaust apparatus 110 is not triggered. At this time, the exhaust apparatus 110 is closed accordingly, and the slider elastic member 132 is elastically restored so that the exhaust slider 131 reaches the first position, returning to the initial state.

In this embodiment, an elastic fit can be formed between the exhaust slider 131 and the exhaust trigger member 200 by energy storing and energy releasing of the slider elastic member 132. In this way, the switching from forming a limiting fit to releasing the limiting fit between the exhaust slider 131 and the exhaust trigger member 200 is smoother, with less damage, and the exhaust slider 131 can also be elastically maintained in the first position by using the slider elastic member 132, so that the limiting effect of the exhaust slider 131 on the exhaust trigger member 200 is more stable and reliable, enabling the product to have better effect in maintaining the exhaust system 100 open.

Embodiment III

In addition to the features of any of the above embodiments, as shown in FIGS. 3 and 5, it is further defined in this embodiment that the self-locking member 130 is provided with a first engagement portion 1311, and the exhaust trigger member 200 is provided with a second engagement portion 213. The first engagement portion 1311 and the second engagement portion 213 can be engaged to lock the exhaust trigger member 200. When the toggle member 400 acts on the exhaust trigger member 200 in the exhaust position, the exhaust trigger member 200 moves downwardly to cause the second engagement portion 213 to be engaged with the first engagement portion 1311, so that the exhaust trigger member 200 maintains the exhaust apparatus 110 in the opened state. When the self-locking member 130 is triggered by the reset trigger member 300, the second engagement portion 213 is disengaged from the first engagement portion 1311 so that limiting is released between the self-locking member 130 and the exhaust trigger member 200. By arranging that the self-locking member 130 and the exhaust trigger member 200 form a limiting fit by being engaged with each other and are released from the limiting fit by being disengaged with each other, the advantages of simple structure, convenient switching, and reliable and stable limiting can be achieved.

In one embodiment, as shown in FIGS. 3 and 5, the first engagement portion 1311 is a convex fastener formed on the exhaust slider 131, and the second engagement portion 213 is an engagement fastener formed on the exhaust trigger member 200. In the process in which the exhaust trigger member 200 moves downwardly in a Y direction (the Y direction is perpendicular to the X direction) to trigger the exhaust apparatus 110, the engagement fastener is engaged with the convex fastener. When the exhaust slider 131 returns to the second position in the X direction, the convex fastener avoids the engagement fastener so that the engagement fastener is disengaged from the convex fastener, removing the limiting effect on the exhaust trigger member 200. At this time, the exhaust trigger member 200 can move upwardly in the Y direction to leave the position, where it triggers the exhaust apparatus 110 to open, to be reset.

In one embodiment, the opposite ends of the convex fastener are provided with a first slip-off surface and a first stopping surface. In one embodiment, the lower surface of the convex fastener is configured as the first stopping surface, and the upper surface thereof is configured as the first slip-off surface. In one embodiment, the first slip-off surface is an inclined surface or an arc surface. In the process in which the exhaust trigger member 200 moves downwardly in the Y direction to trigger the exhaust apparatus 110, the engagement fastener slides along the first slip-off surface, so that the engagement fastener can relatively easily move from the side of the convex fastener on the first slip-off surface to the side of the convex fastener on the first stopping surface, i.e., the engagement fastener can easily move from the upper side of the convex fastener to the lower side of the convex fastener. After the engagement fastener reaches the side (the lower side) of the first stopping surface of the convex fastener, the engagement fastener can be effectively stopped and limited by the first stopping surface, which is beneficial to the formation of a stable limiting fit.

In one embodiment, the two opposite ends of the engagement fastener are provided with a second slip-off surface and a second stopping surface. In one embodiment, the upper surface of the engagement fastener is configured with the second stopping surface and the lower surface of the engagement fastener is configured with the second slip-off surface. In one embodiment, the second slip-off surface is an inclined surface or an arc surface. In the process in which the exhaust trigger member 200 moves downwardly in the Y direction to trigger the exhaust apparatus 110, the convex fastener slides along the second slip-off surface, so that the convex fastener can relatively easily move from the side of the engagement fastener on the second slip-off surface to the side of the engagement fastener on the second stopping surface, i.e., the convex fastener can easily move from the lower side of the engagement fastener to the upper side of the engagement fastener. After the convex fastener reaches the side (the upper side) of the second stopping surface of the engagement fastener, the convex fastener can be effectively stopped and limited by the second stopping surface, which is beneficial to the formation of a stable limiting fit.

Of course, this embodiment is not limited thereto, and in other embodiments, it may also be designed that one of the first engagement portion 1311 and the second engagement portion 213 is replaced with an engagement tongue, and the other is replaced with a socket.

Embodiment IV

In addition to the features of any of the above embodiments, as shown in FIG. 1, it is further defined in this embodiment that the exhaust trigger member 200 and the reset trigger member 300 are arranged side by side.

In addition, the toggle member 400 includes a sliding portion 410 and a protruding portion 420. The sliding portion 410 is adapted to slide between the exhaust position and the closing position. The protruding portion 420 is provided on the sliding portion 410. As shown in FIG. 4, when in the exhaust position, the toggle member 400 causes the protruding portion 420 to press the exhaust trigger member 200 and avoid the reset trigger member 300. As shown in FIG. 6, when in the closing position, the toggle member 400 causes the protruding portion 420 to press the reset trigger member 300.

In this embodiment, the user only needs to move the sliding portion 410 to the exhaust position or the closing position to correspondingly control the exhaust system 100 to open or close, which has the advantages of simple structure and convenient and labor-saving operation. Moreover, the protruding portion 420 is designed to move along with the sliding portion 410 to realize pressing the exhaust trigger member 200 or the reset trigger member 300 in the corresponding position. In this way, it is possible to ensure that the actions between the exhaust trigger member 200 and the reset trigger member 300 do not affect and interfere with each other, while realizing the opening/closing control of the exhaust system 100, leading to more accurate control over the opening and closing of the exhaust system 100.

Further, as shown in FIG. 1, when in an intermediate position between the exhaust position and the closing position, the toggle member 400 causes the protruding portion 420 to avoid the reset trigger member 300 and the exhaust trigger member 200.

It will be appreciated that the intermediate position may be a middle position between the exhaust position and the closing position, although the intermediate position may also be designed between the exhaust position and the middle position, or between the closing position and the middle position.

In this embodiment, it is designed that when the toggle member 400 is in the intermediate position, the protruding portion 420 avoids the reset trigger member 300 and the exhaust trigger member 200, that is, in such a case, the protruding portion 420 will neither press the reset trigger member 300 nor press the exhaust trigger member 200. In this way, after toggling the toggle member 400 to the exhaust position to cause the exhaust trigger member 200 to trigger the exhaust apparatus 110 to open for exhaust, and limiting the exhaust trigger member 200 by the self-locking member 130 to maintain the exhaust apparatus 110 open, it is possible to realize that the toggle member 400 is returned to the intermediate position for reset without affecting the exhaust condition, and the movement of the exhaust trigger member 200 leaving from triggering the exhaust system 100 will not be restricted and disturbed by the protruding portion 420, then when the exhaust system 100 of the product needs to be closed, in addition to toggling the toggle member 400 to the closing position, other ways may be employed to control the exhaust system 100 to be closed. This allows the product to control the closing of the exhaust system 100 in a manner that is not restricted to the manner of toggling the toggle member 400 to the closing position, which is beneficial to improving the control function of the product.

Embodiment V

In addition to the features of any of the above embodiments, as shown in FIG. 1, it is further defined in this embodiment that the exhaust assembly 101 further includes: a first reset elastic member 431 and a second reset elastic member 432.

The first reset elastic member 431 is connected to the toggle member 400 and adapted to drive the toggle member 400 to move in a direction close to the closing position. The second reset elastic member 432 is connected to the toggle member 400 and adapted to drive the toggle member 400 to move in a direction close to the exhaust position.

In one embodiment, the first reset elastic member 431 and the second reset elastic member 432 are springs. Of course, in other embodiments, the springs may be replaced by elastic pieces, elastic rubber, etc.

Both ends of the toggle member 400 are provided with a baffle 411. Each baffle 411 is provided with a protruding post 412. The first reset elastic member 431 is sleeved on the outer side of one of the protruding posts 412, with one end abutting against the baffle 411 where the one protruding post 412 is located. The other end of the first reset elastic member 431 is configured to abut against the upper cover 102 for stability. The second reset elastic member 432 is sleeved on the outer side of the other protruding post 412, with one end abutting against the baffle 411 where the other protruding post 412 is located. The other end of the second reset elastic member 432 is configured to abut against the upper cover 102 for stability.

In this embodiment, a first reset elastic member 431 and a second reset elastic member 432 are provided. When the user drives the toggle member 400 to the closing position, the second reset elastic member 432 is compressed, and after the force applied to the toggle member 400 by the user is removed, the second reset elastic member 432 is elastically restored, which may cause the toggle member 400 to automatically leave the closing position and cause the toggle member 400 to approach the intermediate position for restoring. In addition, when the user drives the toggle member 400 to the exhaust position, the first reset elastic member 431 is compressed, and after the force applied to the toggle member 400 by the user is removed, the first reset elastic member 431 is elastically restored, which may cause the toggle member 400 to automatically leave the exhaust position and cause the toggle member 400 to approach the intermediate position for restoring. In this way, by the coordination between the first reset elastic member 431 and the second reset elastic member 432, the toggle member 400 can always be automatically maintained in the intermediate position, so that the operation stroke of the user controlling the toggle member 400 to exhaust or close is shorter, and the operation is easier.

Further, the protruding portion 420 is configured with an abutment surface 421, and the reset trigger member 300 and the exhaust trigger member 200 are configured with mating surfaces, which are a reset mating surface 311 and an exhaust mating surface 211, respectively. The mating surfaces are used for abutting against the abutment surface 421. At least one of the mating surface and the abutment surface 421 is an inclined surface.

In this embodiment, it is arranged that at least one of the mating surface and the abutment surface 421 is an inclined surface. In this way, by using the inclined surface, the action force of the toggle member 400 in the sliding direction can be well converted into a pressing force suitable for pressing the exhaust trigger member 200 or the reset trigger member 300, e.g., causing the toggle member 400 to move transversely to produce the effect of pressing down the exhaust trigger member 200 or the reset trigger member 300, making the operation more labor-saving, while achieving the purpose of controlling the opening and closing of the exhaust system 100.

In one embodiment, the reset trigger member 300 and the exhaust trigger member 200 are configured with mating surfaces (211 and 311) in a convex arc shape. One end of the protruding portion 420 is connected to the sliding portion 410 and the other end of the protruding portion 420 is a free end. The protruding portion 420 is integrally configured as a wedge that gradually narrows from the connecting end to the free end, and both side surfaces of the protruding portion 420 are formed as inclined surfaces, and the two inclined surfaces are in one-to-one correspondence with the two mating surfaces. In such a structure, by the abutment mating of the convex arc surface with the inclined surface, it is possible to effectively separate a pressing force in the Y direction from the action force perpendicular to the Y direction of the toggle member 400, to correspondingly cause the pressing force in the Y direction to drive the reset trigger member 300 or the exhaust trigger member 200 to move in the Y direction, so that the driving is more efficient and accurate, and the damage of mating of the protruding portion 420 with the reset trigger member 300 and the exhaust trigger member 200 is small.

Embodiment VI

Figure 14:
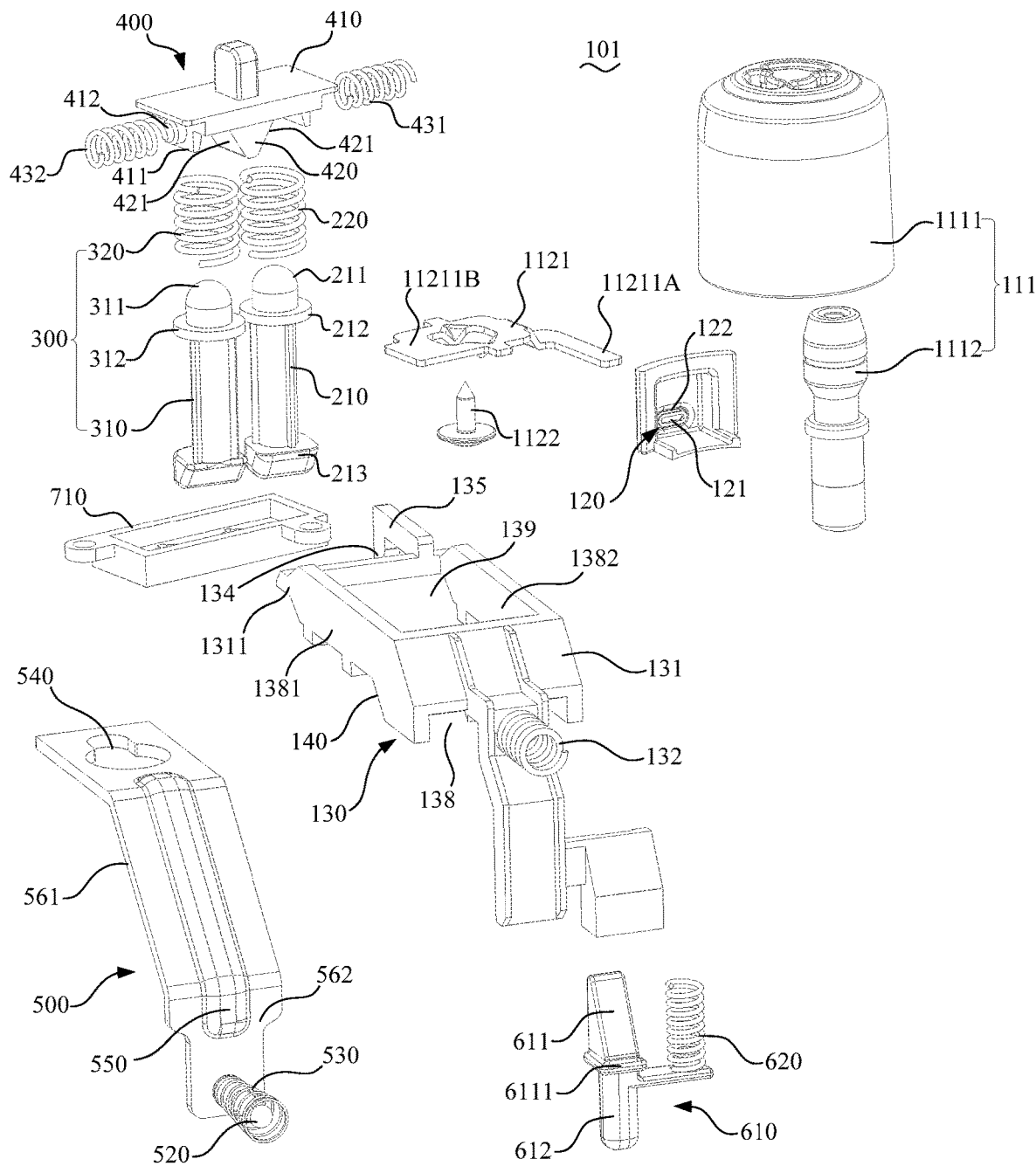
FIG. 14 is an exploded structural view of the exhaust assembly according to an embodiment of the present disclosure.

In addition to the features of any of the above embodiments, as shown in FIG. 14, it is further defined in this embodiment that at least one of the reset trigger member 300 and the exhaust trigger member 200 includes a push rod and a push rod elastic member, the push rod elastic member is connected to the push rod, and when the toggle member 400 acts on the push rod, the push rod triggers the exhaust system 100 and compresses the push rod elastic member, and elastic restoring of the push rod elastic member causes the push rod to stop triggering the exhaust system 100.

In one embodiment, as shown in FIG. 14, the reset trigger member 300 includes a reset push rod 310 and a reset push rod elastic member 320. The reset push rod 310 is configured with a reset stopping edge 312, and the reset push rod elastic member 320 is a spring. Of course, in other embodiments, the reset push rod elastic member 320 may also be replaced by an elastic piece, elastic rubber, etc. The reset push rod elastic member 320 is sleeved on the outer side of the reset push rod 310, with one end abutting against the reset stopping edge 312.

The exhaust trigger member 200 includes an exhaust push rod 210 and an exhaust push rod elastic member 220. The exhaust push rod 210 is configured with an exhaust stopping edge 212. The exhaust push rod elastic member 220 is a spring. Of course, in other embodiments, the exhaust push rod elastic member 220 may also be replaced by an elastic piece, elastic rubber, etc. The exhaust push rod elastic member 220 is sleeved on the outer side of the exhaust push rod 210, with one end abutting against the exhaust stopping edge 212.

In addition, the exhaust assembly 101 further includes a pressing plate 710, the exhaust push rod 210 and the reset push rod 310 each passes through the pressing plate 710, the reset stopping edge 312 and the exhaust stopping edge 212 are each spaced apart from the pressing plate 710, and the other end of the reset push rod elastic member 320 and the other end of the exhaust push rod elastic member 220 abut against the pressing plate 710. The pressing plate 710 is used for connecting to the upper cover 102 to realize assembly of the exhaust trigger member 200 and the reset trigger member 300.

When the exhaust push rod 210 is pressed by the toggle member 400, the exhaust push rod 210 moves downwardly relative to the pressing plate 710 and the exhaust stopping edge 212 and the pressing plate 710 move close to each other. In this process, the exhaust stopping edge 212 and the pressing plate 710 compress the exhaust push rod elastic member 220 so that the exhaust push rod elastic member 220 stores energy. When the exhaust push rod 210 is released by the toggle member 400, the exhaust push rod 210 moves upwardly relative to the pressing plate 710 and the exhaust stopping edge 212 moves away from the pressing plate 710, and the exhaust push rod elastic member 220 is released. At this time, the exhaust push rod elastic member 220 is elastically restored, and the exhaust push rod 210 is driven to move upwardly to reset for the next pressing by the toggle member 400.

The movement process of the reset push rod 310 is similar to that described above, and the movement of the reset push rod 310 with reference to the movement process of the exhaust push rod 210 described above, which will not be described again herein.

In this embodiment, by using the (exhaust or reset) push rod elastic member for energy storing and energy releasing, after the action force exerted by the protruding portion 420 on the reset trigger member 300 or the exhaust trigger member 200 is removed, the reset trigger member 300 or the exhaust trigger member 200 itself can spring back to reset quickly, so that the cooperative response between the reset trigger member 300 or the exhaust trigger member 200 and the exhaust system 100 is more accurate, thus improving the accuracy of the opening/closing control of the exhaust system 100.

Embodiment VII

In addition to the features of any of the embodiments described above, as shown in FIGS. 2, 4 and 6, the exhaust apparatus 110 includes an exhaust valve 111 and a lever mechanism 112. The lever mechanism 112 includes two moment arms 11211. One moment arm 11211A is connected to the exhaust valve 111, and the exhaust trigger member 200 can abut against and act on the other moment arm 11211B to open or close the exhaust valve 111.

In this embodiment, as shown in FIG. 4, when the exhaust trigger member 200 is pressed by the toggle member 400, the exhaust trigger member 200 moves downwardly in the Y direction, and abuts against and acts on the other moment arm 11211B downwardly to cause the one moment arm 11211A to be tilted up to jack up the exhaust valve 111, realizing controlling the exhaust valve 111 to open.

Of course, in other embodiments, it may also be designed that the exhaust valve 111 is opened when it falls. At this time, it may be correspondingly designed that when the exhaust trigger member 200 is pressed by the toggle member 400, the exhaust trigger member 200 abuts against and acts on the other moment arm 11211B upwardly to cause the one moment arm 11211A to be pressed down. In such a case, the exhaust valve 111 can be driven to fall by pressing down the exhaust valve 111 by the moment arm 11211A, or the exhaust valve 111 spontaneously drops due to the lack of support as the moment arm 11211A presses down, controlling the exhaust valve 111 to open.

In this embodiment, as shown in FIGS. 2, 4 and 6, the lever mechanism 112 includes a lever 1121 and a screw 1122. The screw 1122 is used for passing through the lever 1121 to fix the lever 1121, so that the lever 1121 swings with the screw 1122 as the center. One end of the lever 1121 extends away from the screw 1122 to form the one moment arm 11211A, and the other end of the lever 1121 extends away from the screw 1122 to form the other arm 11211B.

In this embodiment, the exhaust trigger member 200 controls the opening or closing of the exhaust valve 111 by means of the lever mechanism 112, which on the one hand is more conducive to the design of the spatial layout between product components, and on the other hand enables more precise control of the compatibility between the magnitude of the output force of the exhaust trigger member 200 and the magnitude of the input force of the exhaust valve 111 by the lever mechanism 112, and the compatibility between the trigger stroke length of the exhaust trigger member 200 and the action stroke length of the exhaust valve 111, improving the accuracy of the opening/closing control of the exhaust system 100.

Further, as shown in FIG. 1, a sealing member 120 is provided between the one moment arm 11211A of the lever mechanism 112 and the exhaust valve 111, which can reduce the leakage from the exhaust valve 111 to the other portions of the exhaust assembly 101, thus ensuring the cleanness of the product, while avoiding the problem of corrosion by steam.

Furthermore, as shown in FIG. 1, the sealing member 120 is provided with a connecting opening 121 and an elastic portion 122, the one moment arm 11211A of the lever mechanism 112 passes through the connecting opening 121, and the elastic portion 122 is compressed when the exhaust trigger member 200 triggers the exhaust valve 111 to open, and elastic restoring of the elastic portion 122 causes the exhaust valve 111 to be closed. By arranging the sealing member 120 and the slider elastic member 132 to be the same component, it is possible to make the product parts multi-purpose, reducing the quantity of product parts and reducing the cost.

In one embodiment, when the toggle member 400 presses the exhaust trigger member 200, the exhaust trigger member 200 presses the moment arm 11211B downwardly in the Y direction. At this time, the moment arm 11211A is tilted up to jack up the exhaust valve 111, and at the same time, the moment arm 11211A compresses the elastic portion 122 to cause the elastic portion 122 to store energy. After the toggle member 400 releases the exhaust trigger member 200, the exhaust trigger member 200 moves upwardly in the Y direction to release the moment arm 11211B. At this time, the moment arm 11211A releases the elastic portion 122 which, in turn, is resiliently restored to drive the moment arm 11211A to swing downwardly for reset. At this time, as the exhaust valve 111 is not jacked up by the moment arm 11211A, the exhaust valve 111 can be free to fall by gravity to be closed automatically.

Of course, in other embodiments, the sealing member 120 and the elastic portion 122 for driving the moment arm 11211A to reset may also be provided as two relatively independent components. In one embodiment, the sealing member 120 connects the lever 1121 and the exhaust valve 111 in a sealing manner. The elastic portion 122 may be designed as a spring or a torsion spring and the spring or the torsion spring acts on the lever 1121, and when the exhaust trigger member 200 triggers the moment arm 11211B of the lever 1121, the spring or the torsion spring is compressed. After the exhaust trigger member 200 leaves the moment arm 11211B of the lever 1121, the spring or the torsion spring is elastically restored to drive the lever 1121 to reset, so that the exhaust valve 111 is driven to close during the restoring of the lever 1121.

Embodiment VIII

In addition to the features of any of the embodiments described above, as shown in FIGS. 9 and 10, it is further defined in this embodiment that the exhaust assembly 101 further includes an upper cover self-locking apparatus 500. The upper cover self-locking apparatus 500 is adapted to move between a self-locking position and an unlocking position. The upper cover self-locking apparatus 500 causes the upper cover 102 and the pot body 20 to be locked when in the self-locking position and causes the upper cover 102 and the pot body 20 to be unlocked when in the unlocking position. It will be appreciated that the locking between the upper cover 102 and the pot body 20 can be understood as that the cover teeth of the upper cover 102 are engaged with the pot teeth 21 of the pot body 20, and the unlocking between the upper cover 102 and the pot body 20 can be understood as that the cover teeth of the upper cover 102 are disengaged with the pot teeth 21 of the pot body 20, and the upper cover self-locking apparatus 500 is connected to the self-locking member 130, and when in the self-locking position, the upper cover self-locking apparatus 500 acts on the self-locking member 130 and causes the self-locking member 130 and the exhaust trigger member 200 to be released from the limiting fit.

In this embodiment, the upper cover self-locking apparatus 500 is connected with the self-locking member 130, and while controlling the upper cover 102 and the pot body 20 to be locked, the upper cover self-locking apparatus 500 drives the self-locking member 130 to release the limiting effect on the exhaust trigger member 200, further causing the exhaust apparatus 110 to close. In one embodiment, since the exhaust trigger member 200 cannot maintain triggering opening of the exhaust apparatus 110 after the self-locking member 130 releases the limiting effect on the exhaust trigger member 200, the exhaust apparatus 110 can be closed to realize reset at this time, i.e., the exhaust apparatus 110 can be closed when the self-locking member 130 releases the limiting effect on the exhaust trigger member 200, realizing that the upper cover self-locking apparatus 500 controls the exhaust system 100 to close while locking the cover, and preventing the problem of a failure in pressure rising in the pot due to forgetting to close the exhaust system 100 manually after manually controlling the exhaust system 100 to exhaust via the toggle member 400.

In one embodiment, the upper cover self-locking apparatus 500 includes a self-locking slider 510 adapted to slide between the self-locking position and the unlocking position. The self-locking member 130 is connected to and slides along with the self-locking slider 510. When the self-locking slider 510 slides from the self-locking position to the unlocking position, the self-locking member 130 and the exhaust triggering member 200 are driven to be released from the limiting fit.

It will be appreciated that the self-locking slider 510 is provided with a self-locking pin 520 and a locking pin elastic member 530, and the self-locking slider 510 is provided with a locking opening 540 for a float to pass through. When the cooking chamber is pressurized, the float is in a limiting fit with the locking opening 540 of the self-locking slider 510 to limit the self-locking slider 510 to further limit the rotation of the upper cover 102 to realize self-locking. When the cooking chamber is not pressurized, the float is unlocked with the locking opening 540, and the self-locking pin 520 on the self-locking slider 510 contacts the pot teeth 21 of the outer pot 23 during the rotation of the upper cover 102, to drive the self-locking slider 510 to slide forward and backward in the X direction, which further drives the exhaust slider 131 to move forward and backward in the X direction. When the self-locking slider 510 moves backward (in the direction away from the center of the upper cover 102), the exhaust slider 131 is driven to move together, so that the exhaust slider 131 and the exhaust trigger member 200 are released from the limiting fit. In this way, in the process of rotating the upper cover 102 to screw and lock the upper cover 102 to the pot body 20, the self-locking slider 510 drives the self-locking member 130 to slide to correspondingly control the exhaust system 100 to close. This can prevent the problem that the pressure in the cooking chamber cannot be normally increased when the cooking chamber returns to work, resulting from forgetting to close the exhaust system 100 when exhaust is performed manually. Moreover, by the double slider design of the exhaust slider 131 and the self-locking slider 510, the advantages of simple structure and high control accuracy can be achieved.

Embodiment IX

This embodiment is distinguished from Embodiment VIII in that the self-locking member and the upper cover self-locking apparatus are the same apparatus or component. In one embodiment, it may also be understood as the self-locking slider 510 and the exhaust slider 131 in the self-locking member 130 being the same component (hereinafter in this embodiment, they are collectively referred to as a self-locking member).

In one embodiment, the self-locking member in this embodiment has the features and functions of the upper cover self-locking apparatus in Embodiment VIII. In one embodiment, for the self-locking member, reference may be made to the self-locking slider 510. The self-locking member is provided with a self-locking pin 520 and a locking pin elastic member 530, and the self-locking member is provided with a locking opening 540 for a float to pass through. When the cooking chamber is pressurized, the float is in a limiting fit with the locking opening 540 of the self-locking member to limit the self-locking member to further limit the rotation of the upper cover 102 to realize self-locking. When the cooking chamber is not pressurized, the float is unlocked with the locking opening 540, and the self-locking pin 520 on the self-locking member contacts the pot teeth 21 of the outer pot 23 during the rotation of the upper cover 102, to drive the self-locking member to slide forward and backward in the X direction. In one embodiment, when driving the self-locking member to move backward (in the direction away from the center of the upper cover 102), the self-locking pin 520 also releases the limiting fit between the self-locking member and the exhaust trigger member 200. In this way, in the process of rotating the upper cover 102 to screw and lock the upper cover 102 to the pot body 20, the self-locking member slides to correspondingly control the exhaust system 100 to close. This can prevent the problem that the pressure in the cooking chamber cannot be normally increased when the cooking chamber returns to work, resulting from forgetting to close the exhaust system 100 when exhaust is performed manually. In another embodiment, the self-locking member in this embodiment also has the features and functions of the self-locking member in any one of Embodiments I to III. In one embodiment, the self-locking member can slide and be adapted to be in a limiting fit with the exhaust trigger member 200 to maintain the opening of the exhaust apparatus 110, and when triggered by the reset trigger member 300, the self-locking member 130 is released from the limiting fit with the exhaust trigger member 200. In one embodiment, with reference to the contents in the above two embodiments, the self-locking member may be understood as a self-locking slider having a mating structure at its rear end, and the mating structure is a series of structures adapted to the exhaust trigger member 200 and the reset trigger member 300, e.g., the first engagement portion, a mating surface structure, etc. Further, the self-locking member may also be provided with a slider elastic member for providing a reset driving force.

Embodiment X

In addition to the features of any of the above embodiments, as shown in FIGS. 12, 13, 14 and 17, it is further defined in this embodiment that the exhaust slider 131 of the self-locking member 130 is provided with support ribs 136 configured to contact a pot cover 1021 in the upper cover 102 and support the exhaust slider 131 on the pot cover 1021. In this way, the exhaust slider 131 can be installed on the pot cover 1021 and slide along the pot cover 1021, which is more conducive to ensuring the sliding stability of the exhaust slider 131. Moreover, by supporting the exhaust slider 131 with the support ribs 136, the purpose of bearing the exhaust slider 131 by the pot cover 1021 is realized, and at the same time, the contact area of the exhaust slider 131 with the pot cover 1021 is reduced, so that the sliding friction of the exhaust slider 131 is reduced, which is more advantageous to ensuring the sliding smoothness and response precision of the exhaust slider 131.

Figure 9:
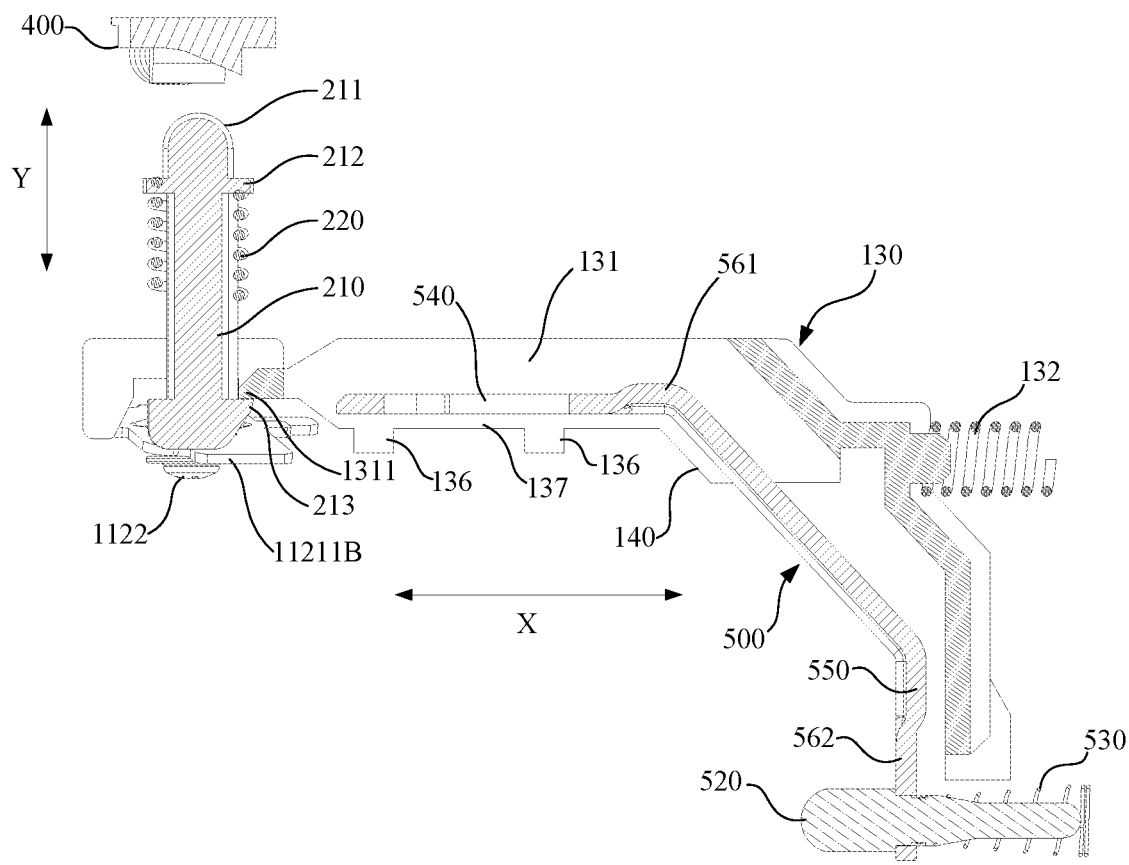
FIG. 9 is a partial sectional structural view of the exhaust assembly in a fourth state according to an embodiment of the present disclosure.
Figure 17:
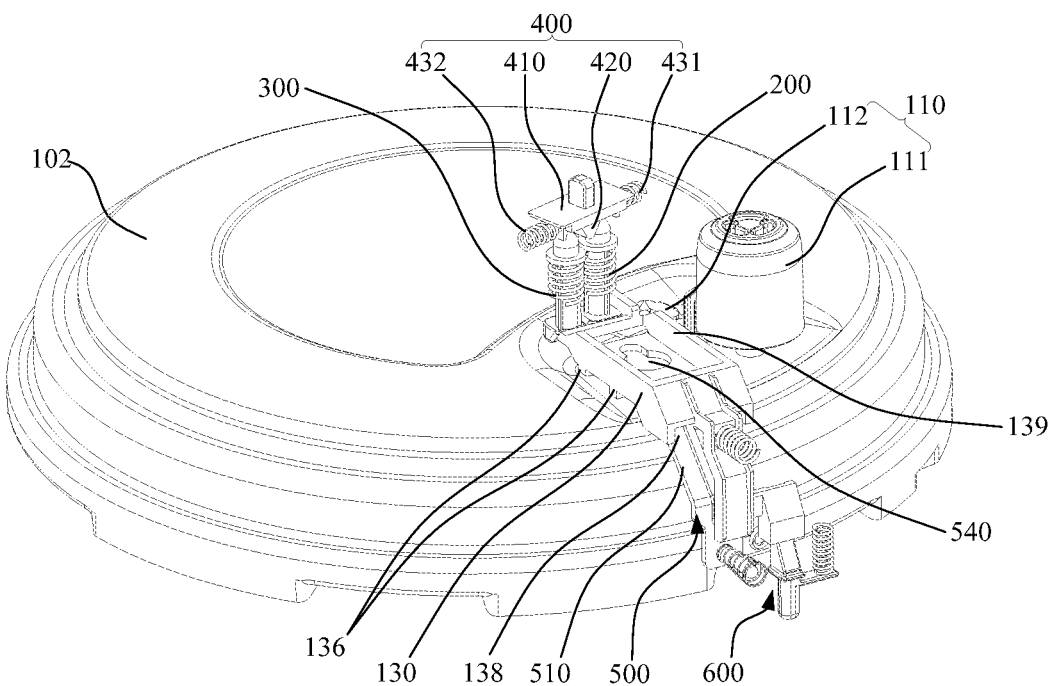
FIG. 17 is a partial structural view of the upper cover assembly shown in FIG. 16 at another viewing angle.

Further, as shown in FIGS. 9 and 17, the exhaust slider 131 is located above the self-locking slider 510, the exhaust slider 131 is provided with two lower extending portions 137 that are opposite to and spaced apart from each other, a portion of the self-locking slider 510 is located between the two lower extending portions 137, and the support rib 136 is provided at the bottom of the lower extending portion 137. The self-locking slider 510 is limited between the two lower extending portions 137, thus improving the positioning, limiting and guiding effects on the self-locking slider 510. Moreover, the exhaust slider 131 is installed on the pot cover 1021 in a covering manner, and the exhaust slider 131 and the pot cover 1021 can limit the self-locking slider 510 in the up-down direction, limiting the self-locking slider 510 in the up-down direction and the left-right direction, and improving the assembly stability of the self-locking slider 510.

Of course, in other embodiments, it may also be designed that the exhaust slider 131 is located above the self-locking slider 510, and the support ribs 136 are distributed on both sides of the self-locking slider 510. In this way, the self-locking slider 510 is limited between the support ribs 136 on both sides, thus improving the positioning, limiting and guiding effects on the self-locking slider 510, realizing limiting the self-locking slider 510 in the up-down direction and the left-right direction, and improving the assembly stability of the self-locking slider 510.

In one embodiment, as shown in FIG. 14, support ribs 136 are provided on the exhaust slider 131 of the self-locking member 130, and the plurality of support ribs 136 are spaced apart from each other. In this way, while the stability of the exhaust slider 131 is improved, the contact area with the pot cover 1021 will not be excessively increased.

Embodiment XI

Figure 11:
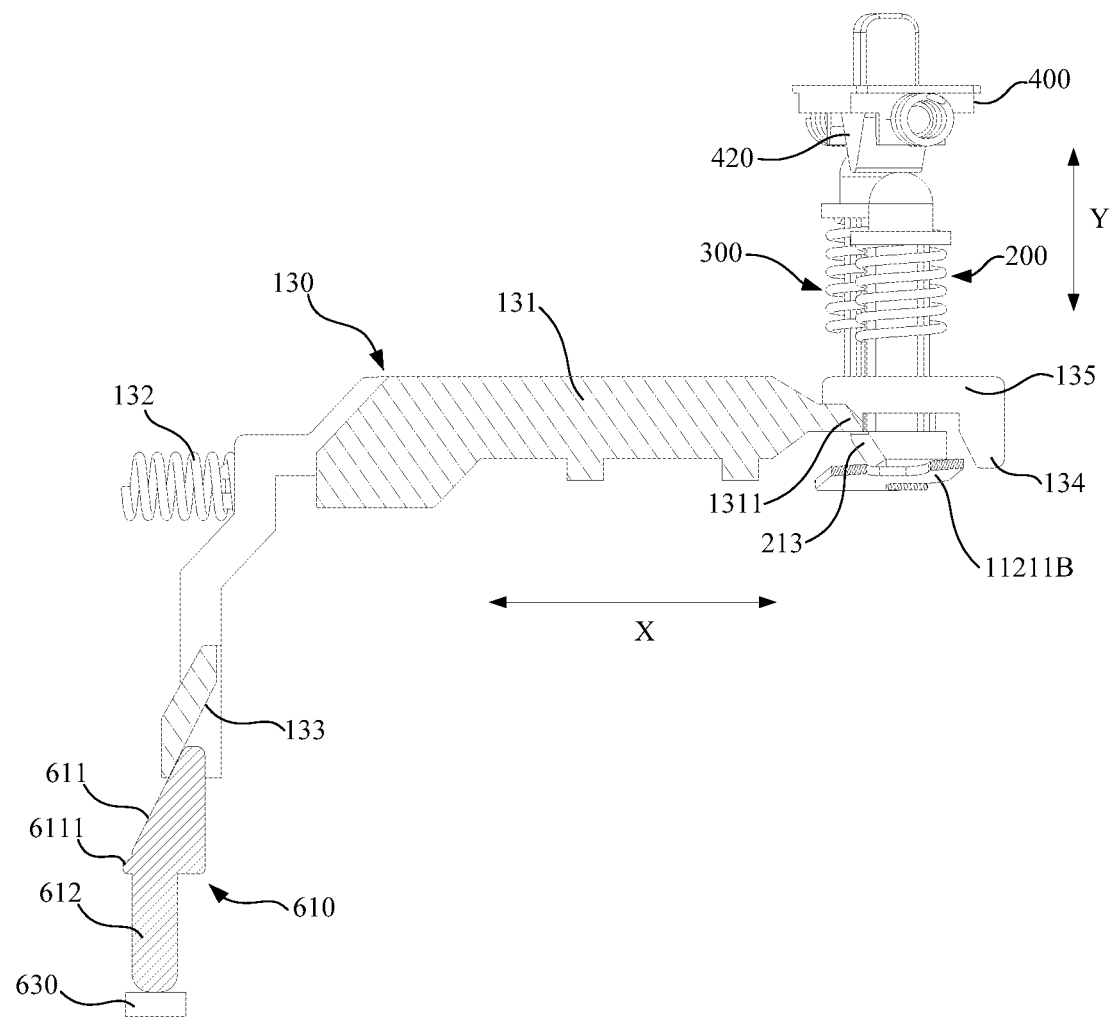
FIG. 11 is a partial sectional structural view of the exhaust assembly in a fifth state according to an embodiment of the present disclosure.
Figure 12:
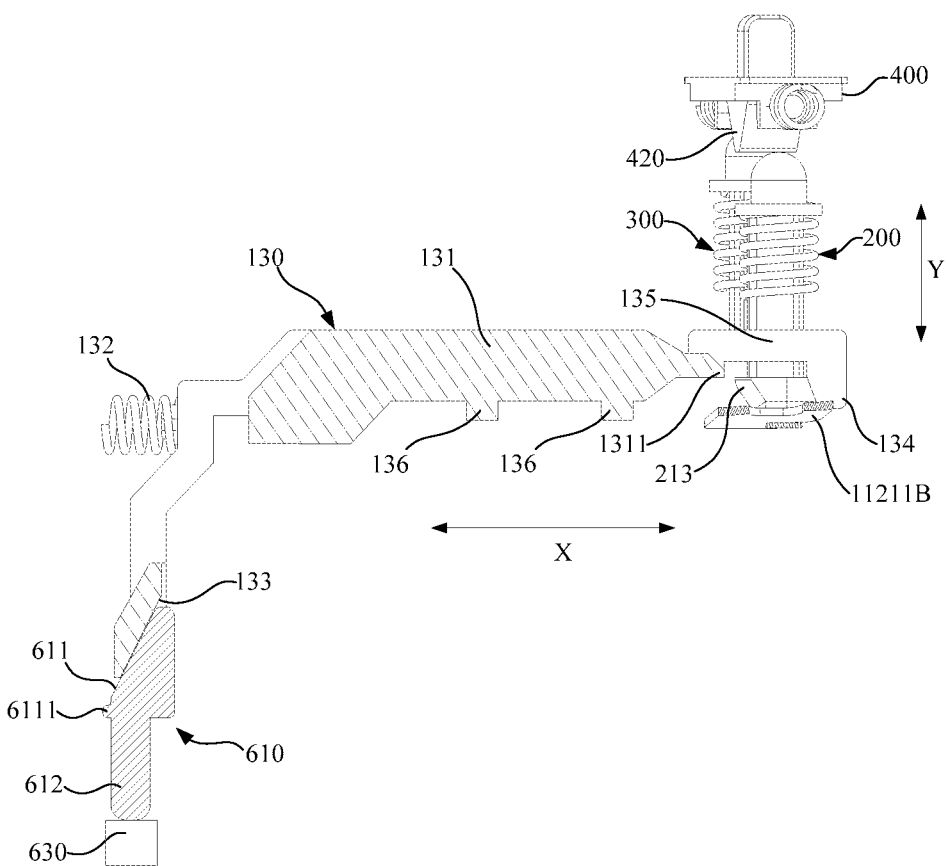
FIG. 12 is a partial sectional structural view of the exhaust assembly in a sixth state according to an embodiment of the present disclosure.
Figure 13:
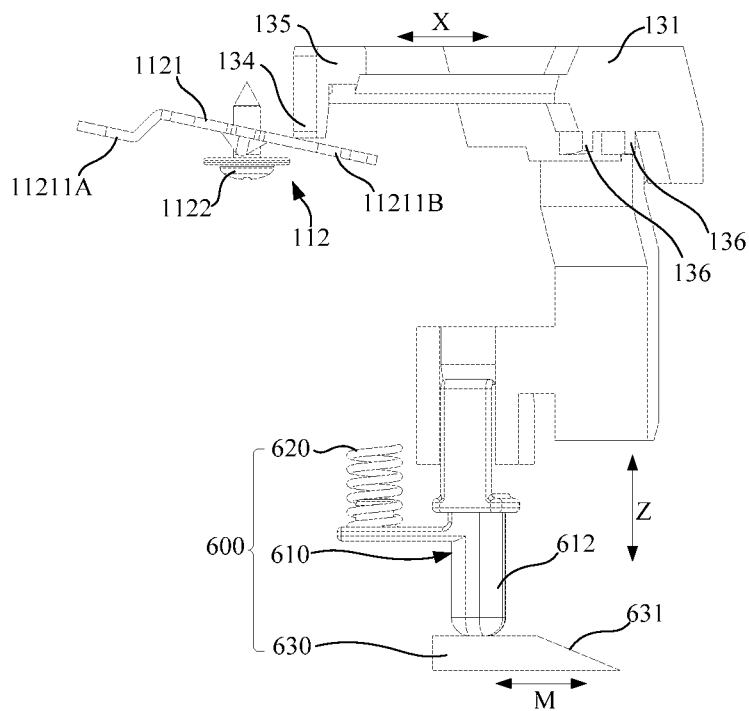
FIG. 13 is a partial perspective structural view of the exhaust assembly shown in FIG. 12.

In addition to the features of any of the above embodiments, as shown in FIGS. 11, 12 and 13, it is further defined in this embodiment that the exhaust assembly 101 further includes a cover rotation trigger mechanism 600, the self-locking member 130 is connected with the cover rotation trigger mechanism 600 and moves along with the cover rotation trigger mechanism 600, and the self-locking member 130 is provided with a trigger portion 134. The trigger portion 134 may be a convex rib formed on the exhaust slider 131. The convex rib extends towards the lever 1121. An extending rib 135 extending outwardly is arranged on the outer side of the first engagement portion 1311 of the exhaust slider 131. The convex rib is connected to the extending rib 135, and they are in bending connection. The cover rotation trigger mechanism 600 is configured to detect a position of the upper cover 102 relative to the pot body 20, and cause the trigger portion 134 to act on the exhaust apparatus 110 and trigger the exhaust apparatus 110 to open, when the upper cover 102 is in the unscrewed position relative to the pot body 20, and cause the trigger portion 134 to leave the exhaust apparatus 110, when the upper cover 102 is in the screwed position relative to the pot body 20, and the exhaust apparatus 110 can be closed, be driven to be closed by the elastic portion 122, or be automatically closed by the exhaust valve 111 due to free fall under gravity.

In this embodiment, a cover rotation trigger mechanism 600 is provided, and the cover rotation trigger mechanism 600 is made to drive the self-locking member 130 to trigger the exhaust apparatus 110 to open, when the upper cover 102 is in the unscrewed position relative to the pot body 20 (i.e., the upper cover 102 is in the position where cover teeth of the upper cover 102 are disengaged with the pot teeth 21 of the pot body 20). In this way, when the upper cover 102 is closed on the pot body 20 in a hot state in the unscrewed position, the problem of unsmooth closing will not occur. In addition, the cover rotation trigger mechanism 600 is made to cause the trigger portion 134 to leave the exhaust apparatus 110, when the upper cover 102 is in the screwed position relative to the pot body 20 (i.e., the upper cover 102 is in the position where the cover teeth of the upper cover 102 are opposite to the pot teeth 21 of the pot body 20). At this time, the trigger portion 134 no longer triggers the exhaust apparatus 110 to open, so that the exhaust apparatus 110 can be closed smoothly to facilitate pressure rising in the pot.

Further, the cover rotation trigger mechanism 600 includes a floating member 610, an elastic support member 620 and an adaptation portion 630.

In one embodiment, the floating member 610 is used for connecting with the upper cover 102, the floating member 610 is in a transmission connection with the self-locking member 130, and floating of the floating member 610 drives the self-locking member 130 to slide. The elastic support member 620 supports the floating member 610. The adaptation portion 630 is used for connecting with the pot body 20 and abutting against the floating member 610. A guide inclined surface 631 is configured between the adaptation portion 630 and the floating member 610. During the rotation of the upper cover 102 relative to the pot body 20, the floating member 610 mates with the adaptation portion 630, the adaptation portion 630 pushes the floating member 610, so that the floating member 610 correspondingly drives the self-locking member 130 to move to cause the trigger portion 134 of the self-locking member 130 to act on the exhaust apparatus 110.

In one embodiment, the floating member 610 is provided with a first inclined wall surface 611, and the exhaust slider 131 of the self-locking member 130 abuts against the first inclined wall surface 611 to form a transmission connection. In the process of up-down floating of the floating member 610, the action force exerted by the floating member 610 on the self-locking member 130 in the Z direction (the Z direction is perpendicular to the X direction) is resolved by the first inclined wall surface 611 to form a component force in the X direction. The exhaust slider 131 can be driven by the component force in the X direction to slide in the X direction.

In one embodiment, the exhaust slider 131 is provided with a second inclined wall surface 133, and the floating member 610 abuts against the second inclined wall surface 133 to form a transmission connection. In the process of up-down floating of the floating member 610, the action force exerted by the floating member 610 on the self-locking member 130 in the Z direction is resolved by the second inclined wall surface 133 to form a component force in the X direction. The exhaust slider 131 can be driven by the component force in the X direction to slide in the X direction.

Figure 19:
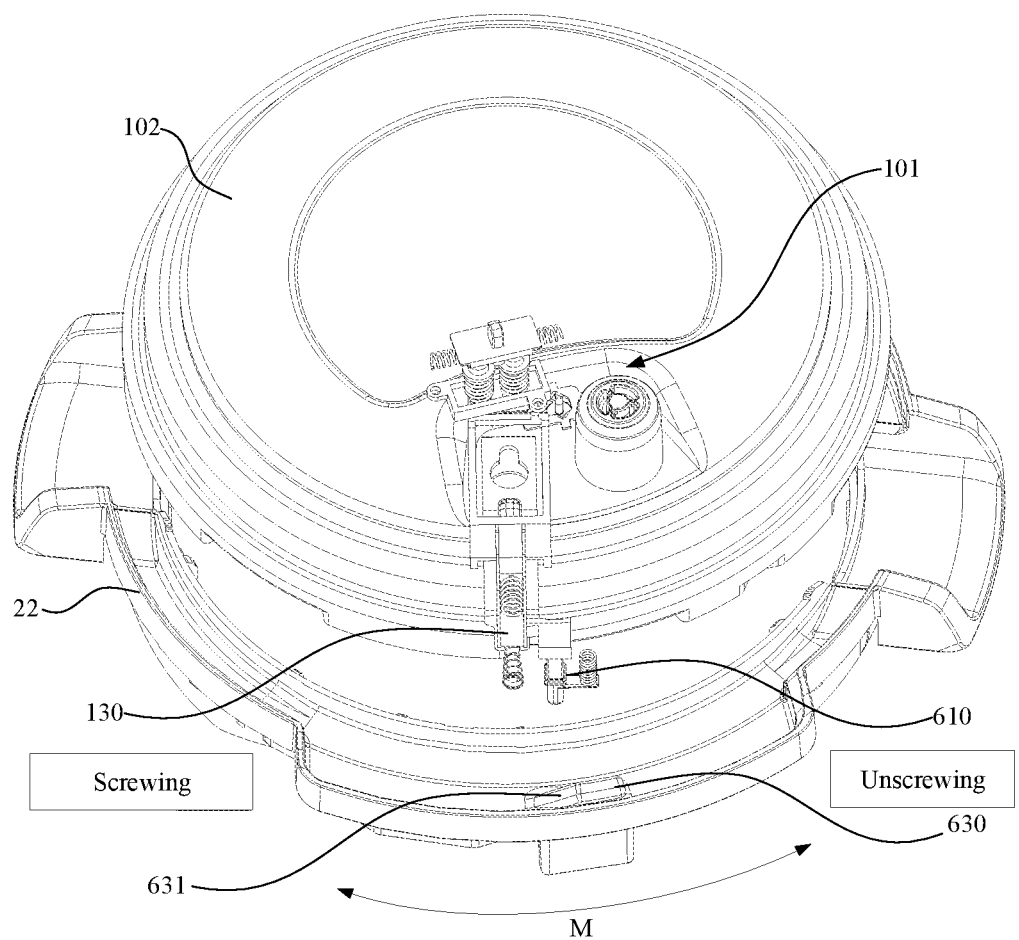
FIG. 19 is an exploded structural view of an assembled member of the upper cover assembly and a housing cover according to an embodiment of the present disclosure.

In one embodiment, as shown in FIGS. 12, 13 and 19, as the upper cover 102 rotates relative to the pot body 20 in the unscrewing direction along M to the unscrewed position in which the pot teeth 21 are disengaged with the cover teeth, the floating member 610 floats up along the guide inclined surface 631 to a point at a relatively higher position. At this time, the exhaust slider 131 slides in the X direction to the trigger portion 134 on the exhaust slider 131 and abuts against the moment arm 11211B of the lever 1121, driving the exhaust valve 111 to open, realizing opening the exhaust valve 111 while the upper cover 102 is in the unscrewed position, and avoiding the case where the upper cover 102 can difficultly be closed on the pot body 20 in the hot state covering process.

As shown in FIGS. 11 and 19, as the upper cover 102 rotates relative to the pot body 20 in the screwing direction along M to the screwed position in which the pot teeth 21 correspond to the cover teeth, the floating member 610 floats down along the guide inclined surface 631 to a point at a relatively lower position. At this time, the exhaust slider 131 is driven by the slider elastic member 132 to cause the trigger portion 134 to leave the moment arm 11211B of the lever 1121, and at this time, the exhaust valve 111 is closed in response, avoiding the problem that it is difficult to pressurize the cooking chamber when the exhaust valve 111 is forgotten to be closed.

Moreover, in this design, by the double slider design of the floating member 610 and the self-locking member 130, the advantages of simple structure and high control precision can further be achieved.

In one embodiment, as shown in FIGS. 11-13, a stopper protrusion 6111 is provided at a lower position of the first inclined wall. The stopper protrusion 6111 is used for abutting against and limiting the exhaust slider 131 to further limit the sliding movement of the exhaust slider 131 in the X direction, and improve the precision of the triggering control of the exhaust apparatus 110 by the exhaust slider 131.

As shown in FIGS. 9, 10, 14 and 17, the exhaust assembly 101 according to an embodiment of the present disclosure includes an exhaust system, an exhaust slider, and a self-locking slider.

In one embodiment, the exhaust system 100 is adapted to be openable and closable, and the exhaust slider 131 is adapted to be slidable. There is a release position for the sliding movement of the exhaust slider 131. When in the release position, the exhaust slider 131 releases the exhaust system 100 to close. The exhaust slider 131 is provided with a slideway 138. As shown in FIG. 17, the self-locking slider 510 is at least partially located in the slideway 138, the self-locking slider 510 and the exhaust slider 131 are in a transmission connection, and the self-locking slider 510 is configured to slide along the slideway 138 during rotation of the upper cover 102 relative to the pot body 20, and drive the exhaust slider 131 so that the exhaust slider 131 reaches the release position.

For the exhaust assembly 101 according to the above embodiment of the present disclosure, when the upper cover 102 rotates relative to the pot body 20 for closing, the self-locking slider 510 can be driven to slide. The self-locking slider 510 is in a transmission connection with the exhaust slider 131, so that during sliding, the self-locking slider 510 can drive the exhaust slider 131 and can drive the exhaust slider 131 to the release position, automatically controlling the exhaust system 100 to close while realizing that the upper cover 102 rotates to be closed, thus effectively solving the problem that the pressure cannot be normally increased in the pot due to the user's forgetting to manually reset the exhaust system 100 to close the exhaust system 100. Moreover, in this structure, the design of disposing a slideway 138 on the exhaust slider 131 and slidably assembling the self-locking slider 510 in the slideway 138 enables a more stable matching and a higher matching precision between the exhaust slider 131 and the self-locking slider 510, which improves the precision of driving control of the exhaust slider 131 and ensures that the exhaust system 100 is closed accurately as the upper cover 102 rotates to be closed.

Embodiment XII

As shown in FIG. 14, in addition to the features of any of the above embodiments, it is further defined in this embodiment that the exhaust slider 131 is provided with a first stopping edge 1381 and a second stopping edge 1382, the first stopping edge 1381 and the second stopping edge 1382 are opposite to and spaced apart from each other to define the slideway 138, and the self-locking slider 510 is located between the first stopping edge 1381 and the second stopping edge 1382, which has the advantages of simple structure and easy processing and manufacturing. Moreover, that the self-locking slider 510 is located between the first stopping edge 1381 and the second stopping edge 1382 enables the self-locking slider 510 and the exhaust slider 131 to be mutually limited, so that the transmission effect between the self-locking slider 510 and the exhaust slider 131 is better, and it is also ensured that the transmission fit between the self-locking slider 510 and the exhaust slider 131 is more stable and reliable, thus ensuring accurate linkage of the exhaust slider 131 with the self-locking slider 510.

In one embodiment, as shown in FIG. 9, the bottom of the second stopping edge 1382 may be a structure defined by bumps arranged at intervals in the front-rear direction, and as shown in FIG. 11, the bottom of the first stopping edge 1381 may be a structure defined by bumps arranged at intervals in the front-rear direction. This is more advantageous in improving the molding quality of the exhaust slider 131, reducing the weight of the exhaust slider 131, and also reducing the friction between the exhaust slider 131 and the upper cover 102. Of course, the design is not limited thereto, and in other embodiments, the second stopping edge 1382 and/or the first stopping edge 1381 may also be designed as a structure extending continuously from front to back.

Further, as shown in FIG. 17, the exhaust slider 131 is located above the self-locking slider 510, and the first stopping edge 1381 and the second stopping edge 1382 extend downwardly and are configured to abut against the upper cover 102. In this way, while the exhaust slider 131 is installed on the upper cover 102 downwardly in a covering manner, the self-locking slider 510 can be limited between the upper cover 102 and the exhaust slider 131, so that the assembly and positioning between the exhaust slider 131 and the self-locking slider 510 are more convenient, and the assembly precision is higher. In addition, an up-down limiting of the self-locking slider 510 can be formed by this structure, so that the transmission fit between the self-locking slider 510 and the exhaust slider 131 is more stable and reliable, thus ensuring accurate linkage of the exhaust slider 131 with the self-locking slider 510.

Embodiment XIII

As shown in FIG. 9, in addition to the features of any of the above embodiments, it is further defined in this embodiment that the self-locking slider 510 is provided with a locking opening 540 for insertion of a float, and the exhaust slider 131 is provided with an escape opening 139 facing the locking opening 540 and used for avoiding the float. In this way, while forming a mutual limiting fit with the self-locking slider 510 through the slideway 138, the exhaust slider 131 is prevented from disturbing the normal self-locking function of the self-locking slider 510, ensuring that the self-locking function of the self-locking slider 510 is accurate and reliable.

Embodiment XIV

As shown in FIG. 9, in addition to the features of any of the above embodiments, it is further defined in this embodiment that the self-locking slider 510 is provided with a locking pin elastic member 530 and a self-locking pin 520, during sliding, the self-locking slider 510 presses or releases the locking pin elastic member 530, and the self-locking pin 520 is configured for sliding engagement with the pot teeth 21 of the pot body 20, so that during the rotation of the upper cover 102 relative to the pot body 20, the self-locking slider 510 is triggered to slide, and the self-locking slider 510 is provided with an abutment portion 550 adjacent to the self-locking pin 520 and configured to abut against the exhaust slider 131 and the self-locking slider 510 drives the exhaust slider 131 to move in a direction close to the release position. By arranging the abutment portion 550 adjacent to the self-locking pin 520, the moment arm 11211 formed when the abutment portion 550 abuts against the exhaust slider 131 is relatively short, which can reduce the torque applied to the self-locking slider 510 and ensure the sliding smoothness of the self-locking slider 510, so that the transmission between the self-locking slider 510 and the exhaust slider 131 is more stable, and the linkage is more reliable and accurate. Moreover, the matching straightness between the self-locking pin 520 and a pin hole on the upper cover 102 is better, the self-locking pin 520 is not easy to be stuck, and the opening and closing of the cover are smoother. And this can also reduce the risk of deformation of the self-locking slider 510 and improve the quality of the product.

Further, as shown in FIGS. 9 and 14, the self-locking slider 510 includes a slider body 561 and a connecting plate 562352, the slider body 561 is provided with a locking opening 540, one end of the connecting plate 562352 is connected to the slider body 561 and the other end of the connecting plate 562352 is provided with the self-locking pin 520 and the locking pin elastic member 530, and the connecting plate 562352 is provided with the abutment portion 550. By arranging all of the abutment portion 550, the self-locking pin 520 and the locking pin elastic member 530 on the connecting plate 562352, the moment arm 11211 formed on the self-locking slider 510 is relatively short, which helps to reduce the torque received by the self-locking slider 510, and ensures the sliding smoothness of the self-locking slider 510, so that the transmission between the self-locking slider 510 and the exhaust slider 131 is more stable, and the linkage is more reliable and accurate. Moreover, the matching straightness between the self-locking pin 520 and the pin hole on the upper cover 102 is better, the self-locking pin 520 is not easy to be stuck, and the opening and closing of the cover are smoother. And this can also reduce the risk of deformation of the self-locking slider 510 and improve the quality of the product. In addition, this design also enables the bearing part of the self-locking slider 510 to avoid the locking opening 540, which helps to ensure the matching effect between the locking opening 540 and the float, and improve the reliability of the self-locking function.

In one embodiment, the connecting plate 562352 extends in the up-down direction, and accordingly, the portion of the exhaust slider 131 corresponding to the connecting plate 562352 also extends in the up-down direction. In this way, a more stable mating can be achieved when the abutment portion 550 on the connecting plate 562352 is in front-rear abutment with the exhaust slider 131.

In one embodiment, as shown in FIG. 9, the abutment portion 550 includes a bulge structure. In this way, the self-locking slider 510 is stiffened in the part for abutment with the exhaust slider 131, reducing the risk of deformation of the self-locking slider 510, and making the matching precision between the self-locking slider 510 and the exhaust apparatus higher. In addition, by the bulge structure abutting against the exhaust slider 131, the part of the self-locking slider 510 for abutting against the exhaust slider 131 can be accurately defined, which is beneficial to maintaining the uniformity of the force received by the self-locking slider 510 and avoiding the problems such as deflection of the self-locking slider 510.

Of course, in other embodiments, the bulge structure may not be provided, and the plate body of the connecting plate 562352 may abut against the exhaust slider 131 to form a transmission fit.

Embodiment XV

In addition to the features of any of the above embodiments, it is further defined in this embodiment that the exhaust slider 131 is adapted to slide between the self-locking position and the release position, and as shown in FIG. 9, the exhaust slider 131 is separated from the abutment portion 550 when in the self-locking position. In this way, when there is no necessity to drive the exhaust slider 131, the self-locking slider 510 is substantially unaffected by the action force from the exhaust slider 131, ensuring that the self-locking function of the self-locking slider 510 is realized accurately.

Embodiment XVI

As shown in FIG. 1, in addition to the features of any of the above embodiments, it is further defined in this embodiment that the exhaust system 100 includes an exhaust valve 111 and a control apparatus C for controlling opening and closing of the exhaust valve 111. The exhaust slider 131 is adapted to slide between the self-locking position and the release position. The exhaust slider 131 is used for acting on the control apparatus C in the self-locking position so that the control apparatus C maintains opening the exhaust valve 111. The exhaust slider 131 is also used for releasing the control apparatus C in the release position. The exhaust slider 131 and the self-locking slider 510 are located on the same side of the control apparatus C and slide relative to the control apparatus 110 to approach or move away from the control apparatus 110. By integrating the exhaust slider 131 and the self-locking slider 510 on the same side of the control apparatus C, and forming the sliding of the exhaust slider 131 as a movement close to or away from the control apparatus C, and the sliding of the self-locking slider 510 as a movement close to or away from the control apparatus C, the product has better space integration, there is no need to provide more space for the sliding installation of the self-locking slider 510 and the exhaust slider 131, and the product has a more compact structure.

Further, as shown in FIGS. 9 and 17, the exhaust slider 131 is provided with a stopper portion 140 configured to abut against the upper cover 102 when the exhaust slider 131 is in the self-locking position, to limit continued movement of the exhaust slider 131 in a direction away from the release position. This helps the exhaust slider 131 to maintain stable in the self-locking position, so that the exhaust slider 131 can accurately and effectively maintain the opening of the exhaust system 100. Moreover, by limiting the exhaust slider 131, it is possible to prevent the action force of the exhaust slider 131 from being further applied to the self-locking slider 510. In this way, when there is no necessity to drive the exhaust slider 131, the self-locking slider 510 is substantially unaffected by the action force from the exhaust slider 131, thus ensuring that the self-locking function of the self-locking slider 510 is realized accurately.

In a specific embodiment of the present disclosure, as shown in FIGS. 1-14, the exhaust assembly 101 includes an exhaust system 100, a self-locking slider assembly, and an exhaust slider assembly.

The exhaust system 100 includes an exhaust valve 111 and a control apparatus C. The control apparatus C includes a toggle lever assembly, a push rod assembly, a lever mechanism 12, a sealing member 120 and a pressing plate 710.

The toggle lever assembly includes a toggle member 400, a first reset elastic member 1233 and a second reset elastic member 1234. In one embodiment, the first reset elastic member 1233 and the second reset elastic member 1234 are springs.

As shown in FIG. 2, the toggle member 400 includes a sliding portion 410 and a protruding portion 420 provided at a bottom end of the sliding portion 410, and both ends of the sliding portion 410 are provided with a baffle 411. Each baffle 411 is provided with a protruding post 412. The first reset elastic member 431 is sleeved on the outer side of one of the protruding posts 412, with one end abutting against the baffle 411 where the one protruding post 412 is located. The other end of the first reset elastic member 431 is configured to abut against the upper cover 102 for stability. The second reset elastic member 432 is sleeved on the outer side of the other protruding post 412, with one end abutting against the baffle 411 where the other protruding post 412 is located. The other end of the second reset elastic member 432 is configured to abut against the upper cover 102 for stability.

The push rod assembly includes the exhaust trigger member 200 and the reset trigger member 300. The exhaust trigger member 200 and the reset trigger member 300 are located on both sides of the protruding portion 420. The toggle member 400 can be manually moved to both sides. As shown in FIGS. 4 and 5, when the toggle member 400 moves to one side to the exhaust position, the first reset elastic member 1233 is compressed to store energy, and the protruding portion 420 presses the exhaust trigger member 200. As shown in FIGS. 6 and 7, when the toggle element 400 moves to the other side to the reset position, the second reset elastic member 1234 is compressed to store energy, and the protruding portion 420 presses the reset trigger member 300.

In one embodiment, the reset trigger member 300 and the exhaust trigger member 200 are configured with mating surfaces (referring to the exhaust mating surface 211 and the reset mating surface 311) in a convex arc shape. One end of the protruding portion 420 is connected to the sliding portion 410 and the other end of the protruding portion 420 is a free end. The protruding portion 420 is integrally configured as a wedge that gradually narrows from the connecting end to the free end, and both side surfaces of the protruding portion 420 are formed as inclined surfaces, and the two inclined surfaces serve as the abutment surfaces 421 for mating with the two mating surfaces (referring to the exhaust mating surface 211 and the reset mating surface 311) in one-to-one correspondence. In such a structure, by the abutment mating of the convex arc surface with the inclined surface, it is possible to effectively separate a pressing force in the up-down direction from the action force perpendicular to the up-down direction of the toggle member 400, to correspondingly cause the pressing force in the up-down direction to drive the reset trigger member 300 or the exhaust trigger member 200 to move in the up-down direction, thus achieving up-down pressing effect on the reset trigger member 300 or the exhaust trigger member 200 when moving the toggle member 400 in the left-right direction, and enabling more efficient and accurate driving, and less damage of mating of the protruding portion 420 with the reset trigger member 300 and the exhaust trigger member 200.

As shown in FIG. 14, the reset trigger member 300 includes a reset push rod 310 and a reset push rod elastic member 320. The reset push rod 310 is configured with a reset stopping edge 312, and the reset push rod elastic member 320 is a spring. Of course, in other embodiments, the reset push rod elastic member 320 may also be replaced by an elastic piece, elastic rubber, etc. The reset push rod elastic member 320 is sleeved on the outer side of the reset push rod 310, with one end abutting against the reset stopping edge 312.

The exhaust trigger member 200 includes an exhaust push rod 210 and an exhaust push rod elastic member 220. The exhaust push rod 210 is configured with an exhaust stopping edge 212. The exhaust push rod elastic member 220 is a spring. Of course, in other embodiments, the exhaust push rod elastic member 220 may also be replaced by an elastic piece, elastic rubber, etc. The exhaust push rod elastic member 220 is sleeved on the outer side of the exhaust push rod 210, with one end abutting against the exhaust stopping edge 212.

The pressing plate 710 is used for connection with the upper cover 102. The exhaust push rod 210 and the reset push rod 310 pass through the pressing plate 710, and the other end of the reset push rod elastic member 320 and the other end of the exhaust push rod elastic member 220 abut against the pressing plate 710, realizing assembly and fixing of the exhaust trigger member 200 and the reset trigger member 300.

In this way, when the toggle member 400 moves to one side to the opening position, the top of the exhaust push rod 210 contacts and drives the exhaust push rod 210 to move downwardly, so that the exhaust push rod elastic member 220 is compressed, and when the protruding portion 420 releases the exhaust push rod 210, the exhaust push rod elastic member 220 is elastically restored so that the exhaust push rod 210 is automatically restored upwardly. When the toggle member 400 moves to one side to the closing position, the protruding portion 420 contacts the top of the reset push rod 310 and drives the reset push rod 310 to move downwardly, so that the reset push rod elastic member 320 is compressed, and when the protruding portion 420 releases the reset push rod 310, the reset push rod elastic member 320 is elastically restored so that the reset push rod 310 is automatically restored upwardly.

As shown in FIGS. 2, 4 and 6, the lever mechanism 12 includes a lever 1121, a screw 1122 and a sealing member. The screw 1122 passes through a central hole of the lever 1121 to fix the lever 1121 to a face cover 1022 of the upper cover 102. A flange surface of the screw 1122 provides a pivot point for the lever 1121. The lever 1121 has two moment arms 11211, i.e., the moment arms 11211A and 11211B. The moment arm 11211B extends to below the exhaust push rod 210, the moment arm 11211A extends through the connecting opening 141 of the sealing member to below the exhaust valve 111. The moment arm 11211B is located directly below the exhaust push rod 210 (as shown in FIG. 2). The exhaust push rod 210 presses the moment arm 11211B downwardly, and the moment arm 11211A presses the exhaust valve 111 upwardly so that the exhaust valve 111 is opened in response.

In the above, the sealing member 120 is also an elastic reset member. The sealing member 120 is used for being installed on the face cover 1022, and the sealing member 120 includes an elastic portion 122. The elastic portion 122 has an elasticity and is adapted to be compressed when the exhaust push rod 210 presses the moment arm 11211B, and elastically reset when the exhaust push rod 210 releases the moment arm 11211B, and drive the moment arm 11211A to reset downwardly to realize the reset of the lever 1121, so that the exhaust valve 111 is automatically closed. Of course, in other embodiments, the exhaust push rod 210 may not be driven to reset upwardly by the exhaust push rod elastic member 220, rather, the exhaust push rod 210 is lifted for reset by the moment arm 11211B when the moment arm 11211A is driven downwardly for reset by the sealing member 120. For the reset closing of the exhaust valve 111, the elastic portion 122 may not be used. Instead, the exhaust valve 111 is automatically reset and closed by falling under gravity when the exhaust push rod 210 releases the moment arm 11211B.

The exhaust valve 111 includes a valve body 1111 and a valve core 1112. The moment arm 11211A drives the valve body 1111 or the valve core 1112 to move to control opening and closing of the exhaust valve 111.

Figure 10:
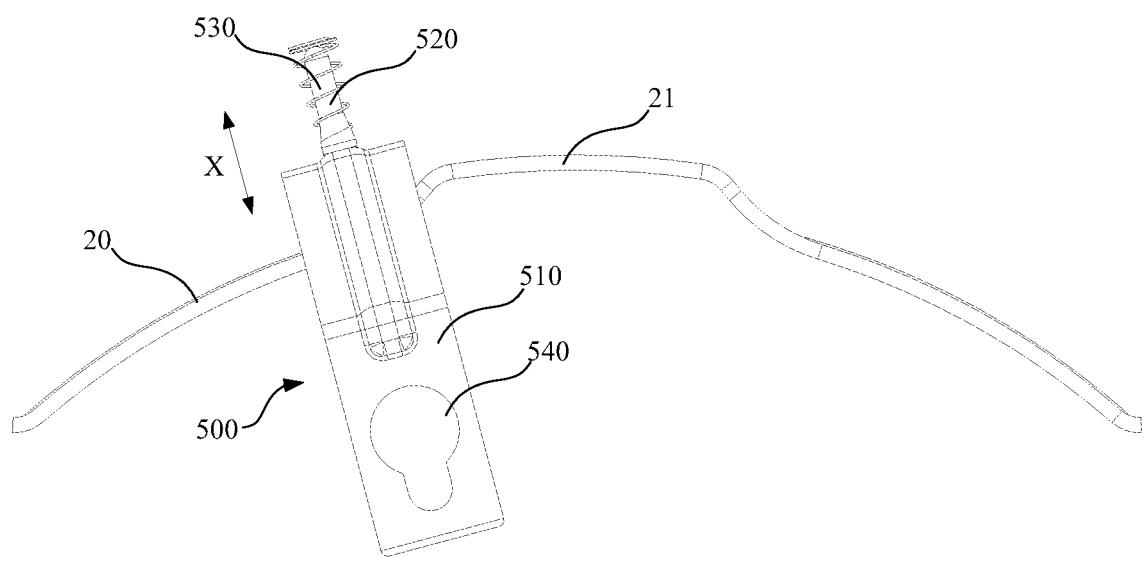
FIG. 10 is a partial structural view of the exhaust assembly shown in FIG. 9 mating with an outer pot.

As shown in FIGS. 9 and 10, the self-locking slider assembly includes the self-locking slider 510, the self-locking pin 520 and the locking pin elastic member 530. The main function of the self-locking slider assembly is to prevent the upper cover 102 from being opened to cause dangers when the pressure rises.

In one embodiment, the self-locking slider 510 is provided with a locking opening 540. After the pressure in the pot rises, the float floats up and passes through the locking opening 540 to restrict the freedom of the self-locking slider 510 in sliding in the front-rear direction (which may be understood as the radial direction of the upper cover 102). At this time, the self-locking pin 520 interferes with the pot teeth 21 to restrict the rotation of the upper cover 102 relative to the pot body 20, restricting the opening of the cover to prevent the upper cover 102 from being opened to cause dangers after the pressure rises. After the pressure in the pot is released, the float drops by gravity to release the limiting fit with the locking opening 540, so that the self-locking slider 510 can freely slide in the front-rear direction (which may be understood as the radial direction of the upper cover 102). At this time, the rigid interference between the self-locking pin 520 and the pot teeth 21 is changed to an elastic fit, releasing the rotation restriction effect on the upper cover 102, so that the upper cover 102 can rotate relative to the pot body 20 to be opened and closed. As shown in FIG. 10, during the rotation of the upper cover 102 relative to the pot body 20, in the process of screwing the pot cover 1021 of the upper cover 102, the self-locking pin 520 on the self-locking slider 510 contacts the pot teeth 21 of the outer pot 23 to drive the self-locking slider 510 to slide back and forth. When the self-locking slider 510 moves backwardly (in a direction away from the center of the upper cover 102), the exhaust slider 131 can be driven to move together, driving the exhaust slider 131 to the release position. After the pot teeth 21 release the self-locking pin 520, the locking pin elastic member 530 automatically resets the self-locking slider 510. In one embodiment, the locking pin elastic member 530 is a spring.

As shown in FIGS. 1 and 3, the exhaust slider assembly includes the exhaust slider 131 and the slider elastic member 132. The front end (the end away from the slider elastic member 132) of the exhaust slider 131 forms two moving pairs with the exhaust push rod 210 and the reset push rod 310. The exhaust push rod 210 and the reset push rod 310 can respectively drive the exhaust slider 131 to slide in the front-rear direction, and the slider elastic member 132 is used for realizing automatic reset of the exhaust slider 131 after the exhaust push rod 210 and the reset push rod 310 release the exhaust slider 131. In one embodiment, the slider elastic member 132 is a spring.

In the above, the front end of the exhaust slider 131 is provided with a first engagement portion 1311, and the lower portion of the exhaust push rod 210 is provided with a first engagement portion 1311. When the exhaust push rod 210 presses the moment arm 11211B downwardly to trigger the exhaust valve 111 to open, the exhaust slider 131 moves forwardly to the self-locking position to cause the first engagement portion 1311 to be engaged with the second engagement portion 213 to restrict the upward reset of the exhaust push rod 210, and the exhaust valve 111 is maintained open. When the exhaust slider 131 moves backwardly to the release position, the first engagement portion 1311 is disengaged with the second engagement portion 213. At this time, the exhaust push rod 210 is automatically reset upwardly and releases the moment arm 11211B, so that the exhaust valve 111 is reset and closed.

In one embodiment, the exhaust slider 131 is provided with a slideway 138, the self-locking slider 510 is at least partially located in the slideway 138, and during the rotation of the upper cover 102 relative to the pot body 20, the self-locking slider 510 slides along the slideway 138, and drives the exhaust slider 131 to reach the release position.

In one embodiment, as shown in FIG. 14, the exhaust slider 131 is provided with a first stopping edge 1381 and a second stopping edge 1382. The first stopping edge 1381 and the second stopping edge 1382 are opposite to and spaced apart from each other to define the slideway 138. The self-locking slider 510 is located between the first stopping edge 1381 and the second stopping edge 1382.

As shown in FIG. 17, the exhaust slider 131 is located above the self-locking slider 510, and the first stopping edge 1381 and the second stopping edge 1382 extend downwardly for abutting against the upper cover 102, realizing limiting the self-locking slider 510 between the exhaust slider 131 and the upper cover 102 in the up-down direction.

As shown in FIGS. 9 and 17, the exhaust slider 131 is provided with an escape opening 139 facing the locking opening 540 and used for avoiding the float to prevent the float from interfering with the exhaust slider 131.

The self-locking slider 510 is provided with an abutment portion 550 adjacent to the self-locking pin 520 and used for abutting against the exhaust slider 131 so that the self-locking slider 510 drives the exhaust slider 131 to move in a direction close to the release position. In one embodiment, the self-locking slider 510 includes a slider body 561 and a connecting plate 562352. The slider body 561 is provided with a locking opening 540. One end of the connecting plate 562352 is connected to the slider body 561, and the other end of the connecting plate 562352 is provided with the self-locking pin 520 and the locking pin elastic member 530. The connecting plate 562352 is provided with an abutment portion 550, and the abutment portion 550 may be a bulge structure formed on the connecting plate 562352 and protruding towards the exhaust slider 131. In one embodiment, as shown in FIG. 9, the exhaust slider 131 is separated from the abutment portion 550 in the self-locking position, although in other embodiments, it is also feasible to arrange the exhaust slider 131 to abut against or just in contact with the abutment portion 550 in the self-locking position.

In one embodiment, as shown in FIGS. 1 and 9, the exhaust slider 131 and the self-locking slider 510 are located on the same side of the control apparatus C (referring to the push rod assembly) and slide relative to the control apparatus C to move close to or away from the control apparatus C. That is, as shown in FIG. 9, the exhaust slider 131 and the self-locking slider 510 are both located at the rear side of the push rod assembly, and the exhaust slider 131 and the self-locking slider 510 slide in the same radial direction of the upper cover 102.

In one embodiment, as shown in FIGS. 9, 17 and 14, the exhaust slider 131 is provided with a stopper portion 140. When the exhaust slider 131 is in the self-locking position, the stopper portion 140 abuts against the upper cover 102 to limit continued movement of the exhaust slider 131 in a direction away from the release position.

As shown in FIGS. 11, 12 and 13, the ejector rod assembly includes a floating member 610 and an elastic support member 620. The floating member 610 is floatingly installed on the pot cover 1021 of the upper cover 102 through the elastic support member 620. The bottom of the floating member 610 is formed as an ejector rod 612, and the top of the floating member 610 is configured in a wedge shape and is inserted into the exhaust slider 131. The wedge-shaped portion of the floating member 610 is formed with a first inclined wall surface 611, the exhaust slider 131 is configured with a second inclined wall surface 133, and the first inclined wall surface 611 slidably mates with the second inclined wall surface 133. As shown in FIG. 19, an adaptation portion 630 is provided on the housing cover 22 of the pot body 20, and the adaptation portion 630 is configured with a guide inclined surface 631. When the upper cover 102 is positioned on the pot body 20, the lower end of the ejector rod 612 of the floating member 610 is always in close contact with the upper surface of the housing cover 22, and the floating member 610 can slide in the up-down direction by pressing or releasing the elastic support member 620. The exhaust slider 131 is provided with a trigger portion 134. When the upper cover 102 rotates relative to the pot body 20 in the M direction towards the unscrewed position, the floating element 610 slides upward to further drive the exhaust slider 131 to move backward (i.e., drive the exhaust slider 131 to move in the direction of compressing the slider elastic member 132). And as shown in FIGS. 12 and 13, when the upper cover 102 rotates relative to the pot body 20 to the unscrewed position, the trigger portion 134 presses the moment arm 11211B to open the exhaust valve 111.

In one embodiment, as shown in FIGS. 11-13, a stopper protrusion 6111 is provided at a lower position of the first inclined wall surface 611. The stopper protrusion 6111 is used for abutting against and limiting the exhaust slider 131 to further limit the sliding movement of the exhaust slider 131 in the front-rear direction, and improve the precision of the triggering control of the exhaust system 100 by the exhaust slider 131.

As shown in FIGS. 11 and 19, when the upper cover 102 rotates relative to the pot body 20 to the screwed position, the floating member 610 slides downwardly, and at this time, the slider elastic member 132 elastically restores and drives the exhaust slider 131 to move forward. When the upper cover 102 rotates relative to the pot body 20 to the screwed position, the trigger portion 134 releases the moment arm 11211B, and at this time, the sealing member 120 springs back to close the exhaust valve 111.

The exhaust assembly 101 provided by this specific embodiment mainly accomplishes three major functions:

1. Exhaust is manually controlled, and the manual exhaust is provided with a self-locking function (the exhaust apparatus is opened in the position where the exhaust slider 131 and the exhaust trigger member 200 are in a limiting fit). There is no necessity to maintain the exhaust state manually, and exhaust may also be terminated manually (by driving the toggle member 400 to the closing position for reset).

2. By means of the self-locking slider 510, in the process of screwing the pot cover 1021, the exhaust apparatus is automatically closed for reset, which prevents the problem that the pressure cannot rise when the cooking chamber returns to work, resulting from forgetting to close and reset the exhaust apparatus manually when exhaust is performed manually.

3. By means of the floating member 610, when the pot cover 1021 is in the unscrewed position, the exhaust valve 111 is in the exhaust state. This serves the function of preventing unsmooth closing of the cover due to pressure increase in the pot, in the process of pressing to close the pot cover 1021, e.g., avoiding the problem of unsmooth closing of the cover when the cover is closed in a hot state.

Working Principle:

As shown in FIGS. 2 and 3, the initial state of the exhaust assembly 101 is shown. The protruding portion 420 of the toggle member 400 is located between the exhaust push rod 210 and the reset push rod 310. At this time, the exhaust push rod 210 and the reset push rod 310 are in the upper limit position, directly below the exhaust push rod 210 is the moment arm 11211B of the lever 1121, the lever 1121 is in a horizontal state, the exhaust valve 111 is closed, and the lower end side surfaces of the exhaust push rod 210 and the reset push rod 310 face the front end of the exhaust slider 131.

As shown in FIGS. 4 and 5, the exhaust state of the exhaust assembly 101 is shown (exhaust is controlled by the toggle member 400). The toggle member 400 slides to the exhaust position, and at this time, the protruding portion 420 is located on the side where the exhaust push rod 210 is located, and the protruding portion 420 pushes the exhaust push rod 210 to move downwardly. During the downward movement of the exhaust push rod 210, the exhaust push rod 210 drives the moment arm 11211B of the lever 1121 to move downwardly. When the exhaust push rod 210 is in the lower limit position, the lever 1121 has the maximum rotation angle and the exhaust valve 111 reaches the maximum opening degree. In addition, during the downward movement of the exhaust push rod 210, the exhaust push rod 210 simultaneously drives the exhaust slider 131 to move backward to compress the slider elastic member 132. When the lower end inclined surface of the second engagement portion 213 on the exhaust push rod 210 is located below the first engagement portion 1311 of the exhaust slider 131, the exhaust slider 131 is driven by the slider elastic member 132 to move back to the first position for restoring. After the exhaust slider 131 moves back, it presses the exhaust push rod 210 to form exhaust self-locking, maintaining the exhaust valve 111 open.

As shown in FIGS. 6, 7 and 8, the closed state of the exhaust assembly 101 (which is controlled to be closed by the toggle member 400) is shown. The toggle member 400 slides to the closing position. At this time, the protruding portion 420 is located on the side where the reset push rod 310 is located, and the protruding portion 420 pushes the reset push rod 310 to move downwardly. In the process of the downward movement of the reset push rod 310, the lower end side inclined surface of the reset push rod 310 pushes the exhaust slider 131 to move backward to compress the slider elastic member 132. When the exhaust slider 131 moves to the second position, the exhaust push rod 210 is disengaged from the exhaust slider 131 to release the limiting fit. At this time, the exhaust push rod 210 moves upward under the elastic driving of the exhaust push rod elastic member 220 to automatically reset, and accordingly, since the pressing action of the exhaust push rod 210 on the moment arm 11211B is released, the sealing member 120 controls the lever 1121 to reset, further causing the exhaust valve 111 to be closed. Herein, since the lower end of the reset push rod 310 cannot form self-locking with the exhaust slider 131, after the toggle member 400 leaves the closing position, the reset push rod 310 moves upward under the elastic action of the reset push rod elastic member 320 to automatically reset, which further causes the exhaust slider 131 to automatically reset and return to the initial state.

FIGS. 9 and 10 are schematic structural diagrams showing that the exhaust assembly 101 is automatically reset (the exhaust valve 111 of the exhaust assembly 101 is closed) during the screwing process of the pot cover 1021 of the upper cover 102. In the manual exhaust state, when the exhaust push rod 210 is in the lower limit position, the moment arm 11211B of the lever 1121 is pressed down, the exhaust valve 111 is opened, and the exhaust slider 131 locks the exhaust push rod 210. At this time, when the pot cover 1021 of the upper cover 102 is rotated, the self-locking pin 520 on the self-locking slider 510 cooperates with the pot teeth 21 of the outer pot 23 to drive the self-locking slider 510 to move backward. The self-locking slider 510 is connected to the exhaust slider 131. In the process of backward movement of the self-locking slider 510, the exhaust slider 131 is driven to move backward, so that the exhaust push rod 210 is unlocked and reset, as shown in FIG. 10, when the self-locking slider 510 slides from one side of the pot teeth 21 to the other side of the pot teeth 21, the exhaust apparatus can be reset once.

FIG. 14 is a schematic structural diagram showing automatic exhaust of the exhaust assembly 101 when the exhaust assembly 101 is in the unscrewed position. When the lower end of the ejector rod 612 of the floating member 610 protrudes out of the face cover 1022, and the upper cover 102 is placed on the pot body 20, the lower end surface of the ejector rod 612 contacts the surface of the housing cover 22, and directly below the ejector rod 612 is the adaptation portion 630 on the housing cover 22. The adaptation portion 630 is a boss structure. The top end of the boss structure and the surface of the housing cover 22 are transited by the guide inclined surface 631. At this time, the lower end of the ejector rod 612 is pressed against the boss structure. When the upper cover 102 rotates relative to the pot body 20 in a direction close to the unscrewed position, the ejector rod 612 slides upward along the guide inclined surface 631. The upper end of the floating member 610 cooperates with the rear end of the exhaust slider 131 to form a moving pair, which drives the exhaust slider 131 to move backward when the floating member 610 floats upward (driving the exhaust slider 131 to move in the direction of compressing the slider elastic member 132). The front end of the exhaust slider 131 is designed with a trigger portion 134. During the backward movement of the exhaust slider 131, the trigger portion 134 slides to the moment arm 11211B of the lever 1121, the moment arm 11211B is pressed down, and the exhaust valve 111 is opened. On the contrary, when the upper cover 102 rotates relative to the pot body 20 in the direction close to the screwed position, the floating member 610 floats downwardly along the guide inclined surface 631. When the upper cover 102 rotates to the screwed position, the ejector rod 612 slides down from the boss structure of the housing cover 22, the ejector rod 612 is reset, and the exhaust slider 131 is driven to reset by the slider elastic member 132, so that the trigger portion 134 leaves the moment arm 11211B, the lever 1121 is reset, and the exhaust valve 111 is closed.

An embodiment of the present disclosure provides an upper cover assembly 10, including: an upper cover 102, and the exhaust assembly 101 according to any of the above embodiments, disposed on the upper cover 102.

The upper cover assembly 10 provided in the above embodiment of the present disclosure is provided with the exhaust assembly 101 described in any of the above embodiments, and therefore has all the above beneficial effects, which will not be described in detail herein.

Figure 15:
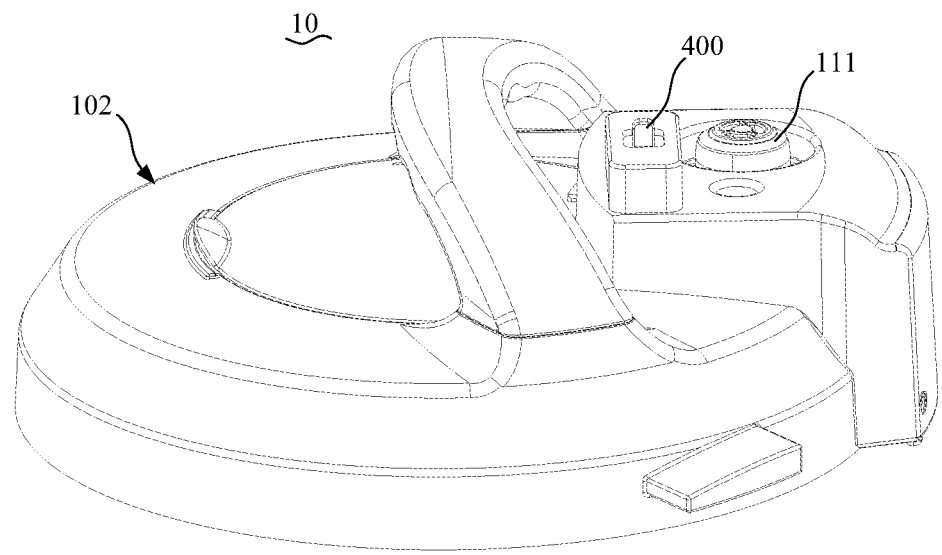
FIG. 15 is a schematic perspective structural view of an upper cover assembly according to an embodiment of the present disclosure.
Figure 16:
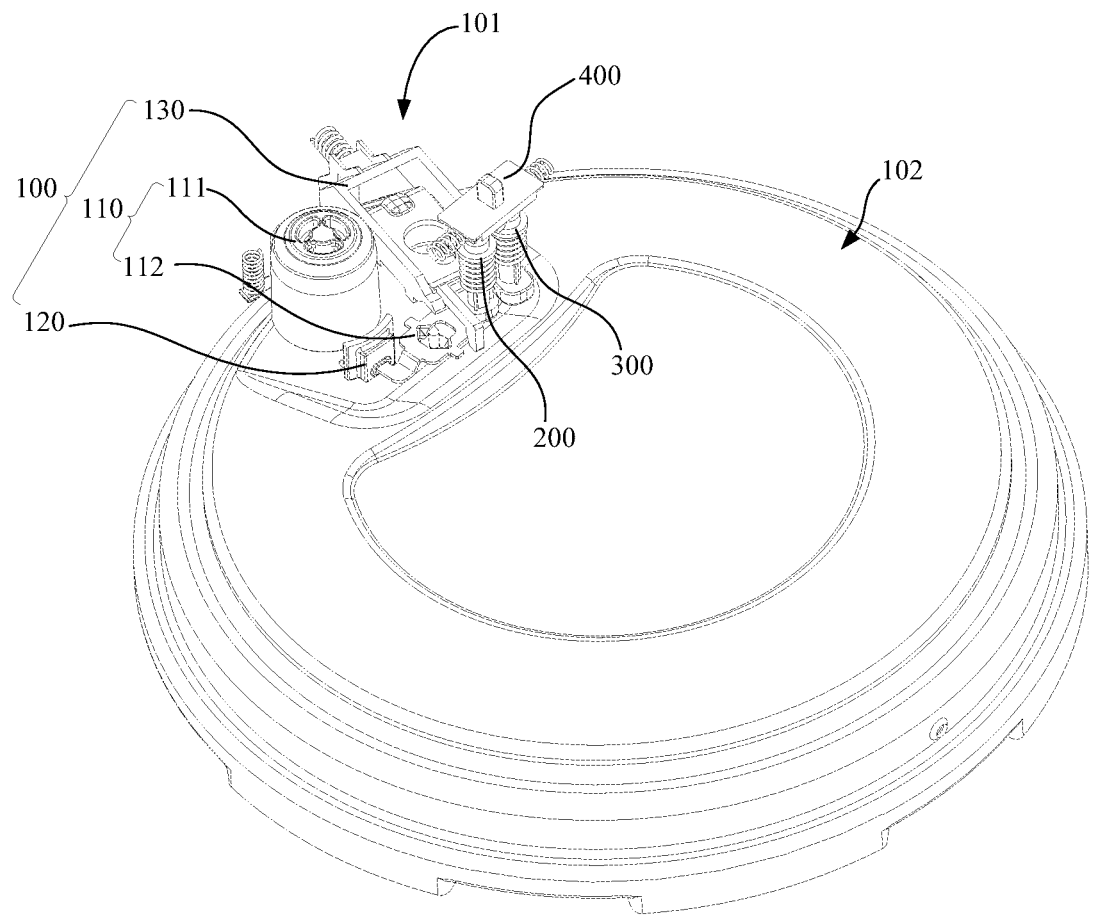
FIG. 16 is a partial structural view of the upper cover assembly according to an embodiment of the present disclosure.

In one embodiment, as shown in FIGS. 15, 16 and 17, the upper cover assembly 10 includes an upper cover 102 and an exhaust assembly 101.

Figure 18:
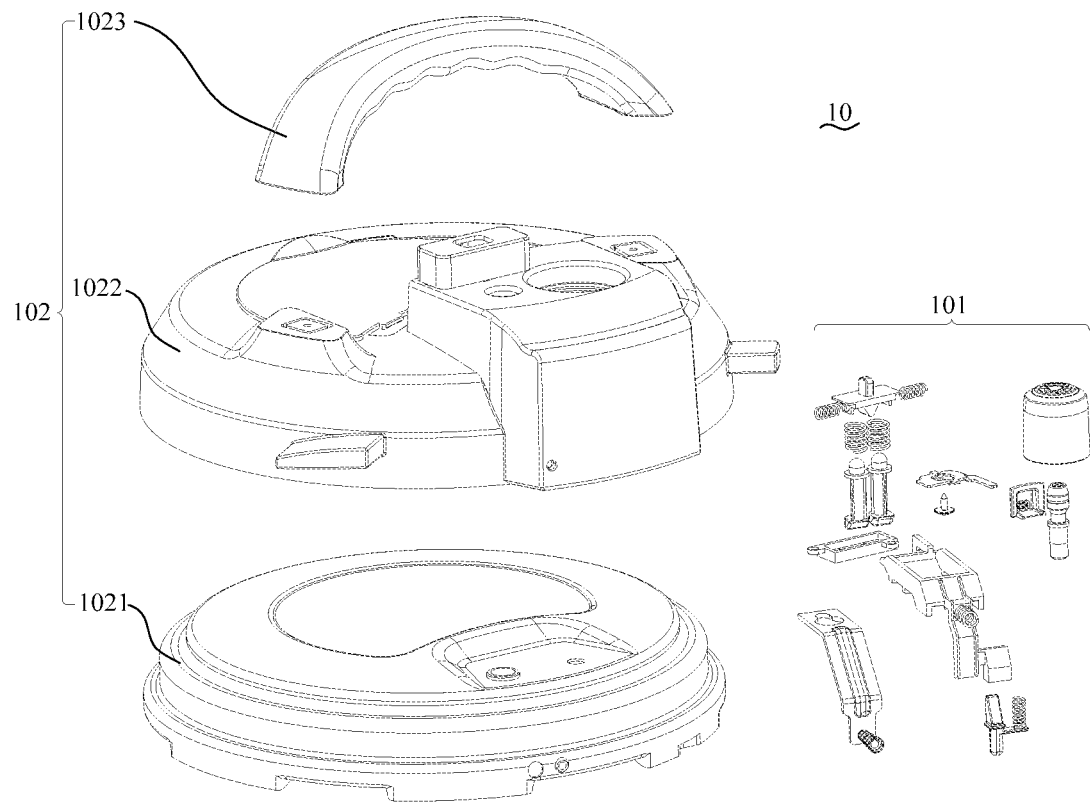
FIG. 18 is an exploded structural view of the upper cover assembly according to an embodiment of the present disclosure.

As shown in FIG. 18, the upper cover 102 includes a pot cover 1021, a face cover 1022, a handle 1023, etc. The pot cover 1021 is used for closing the inner pot 30 of the pot body 20 and the pot cover 1021 and the face cover 1022 define a cooking chamber. The face cover 1022 is provided on the pot cover 1021, as shown in FIG. 15, the majority of the exhaust assembly 101 is located between the face cover 1022 and the pot cover 1021, and the handle 1023 is disposed on the face cover 1022. In the exhaust assembly 101, at least a portion of the toggle member 400 is exposed outside the face cover 1022 for the user to operate to control the opening or closing of the exhaust system 100. In one embodiment, a portion of the exhaust valve 111 is exposed outside the face cover 1022 to enhance the exhaust effect.

FIGS. 16 and 17 are schematic structural diagrams of the upper cover assembly 10 after the face cover 1022 is removed. Most of the components of the exhaust assembly 101 are located on the pot cover 1021.

An embodiment of the present disclosure provides a cooking device 1, including the exhaust assembly 101 as described in any of the above embodiments.

The cooking device 1 provided by the above embodiment of the present disclosure is provided with the exhaust assembly 101 described in any of the above embodiments, and therefore has all the above beneficial effects, which will not be described herein.

In one embodiment, the cooking device 1 may be an electric pressure cooker, a pressure rice cooker, an air fryer, a steam oven, etc.

Figure 20:
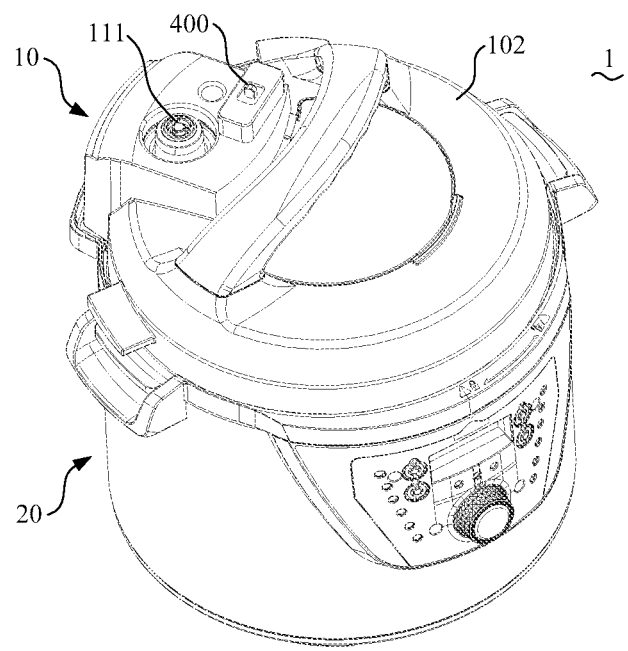
FIG. 20 is a schematic perspective structural view of a cooking device according to an embodiment of the present disclosure.
Figure 21:
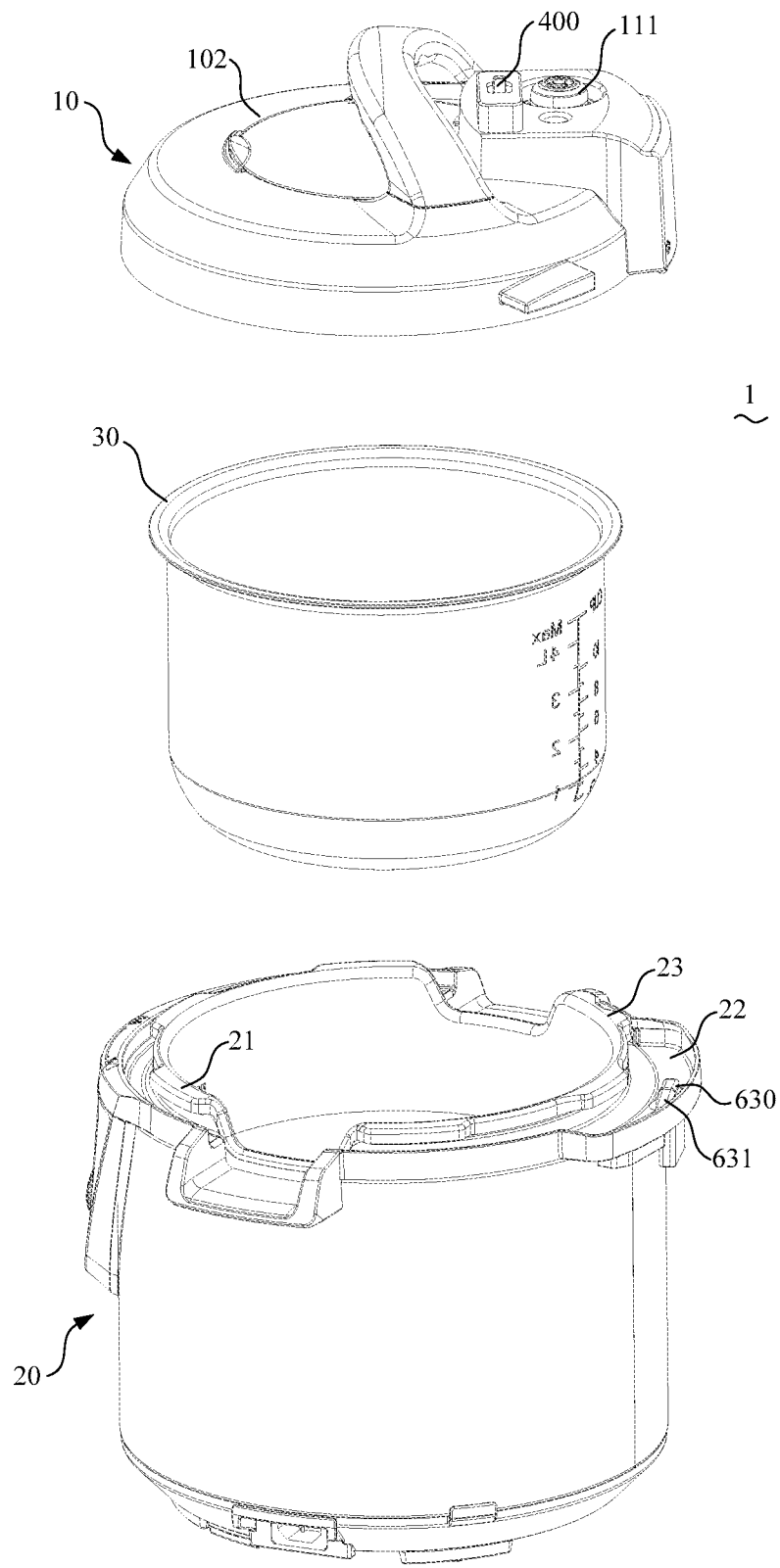
FIG. 21 is an exploded structural view of the cooking device shown in FIG. 20.

As shown in FIGS. 20 and 21, the cooking device 1 is an electric pressure cooker. The electric pressure cooker includes an upper cover assembly 10 and a pot body 20, and an inner pot 30 is disposed in the pot body 20. When the upper cover assembly 10 closes the pot body 20, the pot cover 1021 of the upper cover assembly 10 defines a cooking chamber with the inner pot 30. The upper cover assembly 10 includes an exhaust assembly 101, which, when opened, is used for exhausting of the cooking chamber to the outside.

1. An exhaust assembly, including:
    an exhaust system, adapted to be openable and closable;
    an exhaust slider, adapted to be slidable, wherein there is a release position for the sliding movement of the exhaust slider, when in the release position, the exhaust slider releases the exhaust system to close, and the exhaust slider is provided with a slideway; and
    a self-locking slider, at least partially located in the slideway, wherein the self-locking slider and the exhaust slider are in a transmission connection, and the self-locking slider is configured to slide along the slideway during rotation of the upper cover relative to the pot body, and drive the exhaust slider so that the exhaust slider reaches the release position.
2. The exhaust assembly according to clause 1, wherein the exhaust slider is provided with a first stopping edge and a second stopping edge, the first stopping edge and the second stopping edge are opposite to and spaced apart from each other to define the slideway, and the self-locking slider is located between the first stopping edge and the second stopping edge.
3. The exhaust assembly according to clause 2, wherein the exhaust slider is located above the self-locking slider, and the first stopping edge and the second stopping edge extend downwardly and are configured to abut against the upper cover.
4. The exhaust assembly according to any one of clauses 1-3, wherein
    the self-locking slider is provided with a self-locking opening for insertion of a float, and the exhaust slider is provided with an escape opening facing the self-locking opening and used for avoiding the float.
5. The exhaust assembly according to any one of clauses 1-3, wherein
    the self-locking slider is provided with a locking pin elastic member and a self-locking pin, during sliding, the self-locking slider presses or releases the locking pin elastic member, and the self-locking pin is configured for sliding engagement with pot teeth of the pot body, so that during the rotation of the upper cover relative to the pot body, the self-locking slider is triggered to slide, wherein the self-locking slider is provided with an abutment portion adjacent to the self-locking pin and configured to abut against the exhaust slider and the self-locking slider drives the exhaust slider to move in a direction close to the release position.
6. The exhaust assembly according to clause 5, wherein the self-locking slider includes a slider body and a connecting plate, the slider body is provided with a self-locking opening, one end of the connecting plate is connected to the slider body and the other end of the connecting plate is provided with the self-locking pin and the locking pin elastic member, and the connecting plate is provided with the abutment portion.
7. The exhaust assembly according to clause 5, wherein the abutment portion includes a bulge structure.
8. The exhaust assembly according to clause 5, wherein the exhaust slider is adapted to slide between a self-locking position and the release position, and
    the exhaust slider is separated from the abutment portion when in the self-locking position.
9. The exhaust assembly according to any one of clauses 1-3, wherein
    the exhaust system includes an exhaust valve and a control apparatus for controlling opening and closing of the exhaust valve, the exhaust slider is adapted to slide between a self-locking position and the release position, the exhaust slider is used for acting on the control apparatus when in the self-locking position so that the control apparatus maintains opening the exhaust valve, and the exhaust slider is further used for releasing the control apparatus in the release position, wherein the exhaust slider and the self-locking slider are located on the same side of the control apparatus and slide relative to the control apparatus to approach or move away from the control apparatus.
10. The exhaust assembly according to clause 9, wherein the exhaust slider is provided with a stopper portion configured to abut against the upper cover when the exhaust slider is in the self-locking position, to limit continued movement of the exhaust slider in a direction away from the release position.
11. An upper cover assembly, including:
    an upper cover; and
    the exhaust assembly according to any one of clauses 1-10, disposed on the upper cover.
12. A cooking device, including the exhaust assembly according to any one of clauses 1-10.

In the present disclosure, the terms "first", "second", and "third" are used for the purpose of description only, and cannot be understood as indicating or implying relative importance; and the term "plurality" means two or more, unless otherwise expressly defined. The terms "installing", "connected", "connection", "fixing" and the like should be understood in a broad sense. In one embodiment, "connection" may be a fixed connection, a removable connection or an integral connection; and "connected" may refer to direct connection or indirect connection through an intermediary.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or unit referred to must have a particular direction and is constructed and operated in a specific orientation, and thus cannot be understood as a limitation of the present disclosure.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

What is claimed is:

1. An exhaust assembly, comprising:
   an exhaust system, configured to be opened and closed;
   an exhaust trigger member, connected to the exhaust system and adapted to trigger the exhaust system to open;
   a reset trigger member, connected to the exhaust system and adapted to trigger the exhaust system to close; and
   a toggle member, adapted to move between an exhaust position and a closing position, wherein in the exhaust position, the toggle member acts on the exhaust trigger member and causes the exhaust trigger member to trigger the exhaust system to open, and in the closing position, the toggle member acts on the reset trigger member and causes the reset trigger member to trigger the exhaust system to close;
   wherein the exhaust trigger member and the reset trigger member are arranged side by side, and the toggle member comprises:
   a sliding portion, adapted to slide between the exhaust position and the closing position; and
   a protruding portion, provided on the sliding portion, wherein in the exhaust position, the toggle member causes the protruding portion to press the exhaust trigger member, and in the closing position, the toggle member causes the protruding portion to press the reset trigger member, wherein
   in an intermediate position between the exhaust position and the closing position, the toggle member causes the protruding portion to avoid the reset trigger member and the exhaust trigger member.

2. The exhaust assembly according to claim 1, further comprising:
   a first reset elastic member, connected to the toggle member and adapted to drive the toggle member to move in a direction close to the closing position; and
   a second reset elastic member, connected to the toggle member and adapted to drive the toggle member to move in a direction close to the exhaust position.

3. The exhaust assembly according to claim 1, wherein the protruding portion is configured with an abutment surface,
   the reset trigger member and the exhaust trigger member are each configured with a mating surface, for abutting against the abutment surface, wherein at least one of the mating surface and the abutment surface is an inclined surface.

4. The exhaust assembly according to claim 1, wherein the exhaust apparatus comprises:
   an exhaust valve; and
   a lever mechanism, comprising two moment arms, wherein one of the moment arms is connected to the exhaust valve, the exhaust trigger member is configured to abut against and acting on the other moment arm to cause the one moment arm to be tilted up to jack up the exhaust valve, or the exhaust trigger member is configured to abut against and acting on the other moment arm to cause the one moment arm to be pressed down to drop the exhaust valve, wherein
   a sealing member is provided between the one moment arm of the lever mechanism and the exhaust valve, the sealing member is provided with a connecting opening and an elastic portion, the one moment arm of the lever mechanism passes through the connecting opening, and the elastic portion is compressed when the exhaust trigger member triggers the exhaust valve to open wherein elastic restoring of the elastic portion causes the exhaust valve to be closed.

5. The exhaust assembly according to claim 1, further comprising:
   an upper cover self-locking apparatus, comprising a self-locking slider, adapted to slide between a self-locking position and an unlocking position, the self-locking slider causing the upper cover and a pot body to be locked in the self-locking position, and causing the upper cover and a pot body to be unlocked in the unlocking position, wherein
   the self-locking member is connected to the self-locking slider and slides with the self-locking slider, and when sliding from the self-locking position to the unlocking position, the self-locking slider drives the self-locking member and the exhaust trigger member to be released from the limiting fit, wherein
   the exhaust slider of the self-locking member is provided with support ribs configured to contact a pot cover in the upper cover and support the exhaust slider on the pot cover, wherein
   the exhaust slider is located above the self-locking slider, the support ribs are distributed on both sides of the self-locking slider, or
   the exhaust slider is located above the self-locking slider, the exhaust slider is provided with two lower extending portions that are opposite to and spaced apart from each other, a portion of the self-locking slider is located between the two lower extending portions, and the support rib is provided at the bottom of the lower extending portion.

6. The exhaust assembly according to claim 5, wherein there is a release position for the sliding movement of the exhaust slider of the self-locking member, in the release position, the exhaust slider releases the exhaust system to close, and the exhaust slider is provided with a slideway,
   the self-locking slider is at least partially located in the slideway, the self-locking slider and the exhaust slider are in a transmission connection, and the self-locking slider is configured to slide along the slideway during rotation of the upper cover relative to the pot body, and drive the exhaust slider, so that the exhaust slider reaches the release position.

7. The exhaust assembly according to claim 6, wherein the exhaust slider is provided with a first stopping edge and a second stopping edge, the first stopping edge and the second stopping edge are opposite to and spaced apart from each other to define the slideway, and the self-locking slider is located between the first stopping edge and the second stopping edge.

8. The exhaust assembly according to claim 7, wherein the exhaust slider is located above the self-locking slider, and the first stopping edge and the second stopping edge extend downwardly and are configured to abut against the upper cover.

9. The exhaust assembly according to claim 6, wherein the self-locking slider is provided with a self-locking opening, for insertion of a float, and the exhaust slider is provided with an escape opening, facing the self-locking opening and used for avoiding the float.

10. The exhaust assembly according to claim 6, wherein the self-locking slider is provided with a locking pin elastic member and a self-locking pin, during sliding, the self-locking slider is configured to press or release the locking pin elastic member, and the self-locking pin is configured for sliding engagement with pot teeth of the pot body, so that during the rotation of the upper cover relative to the pot body, the self-locking slider is triggered to slide, wherein the self-locking slider is provided with an abutment portion, adjacent to the self-locking pin and configured to abut against the exhaust slider, wherein the self-locking slider drives the exhaust slider to move in a direction close to the release position, wherein
the self-locking slider comprises a slider body and a connecting plate, the slider body is provided with a self-locking opening, one end of the connecting plate is connected to the slider body and the other end of the connecting plate is provided with the self-locking pin and the locking pin elastic member, and the connecting plate is provided with the abutment portion, and wherein the abutment portion comprises a bulge structure.

11. The exhaust assembly according to claim 10, wherein the exhaust slider is adapted to slide between the self-locking position and the release position, and the exhaust slider is separated from the abutment portion in the self-locking position.

12. The exhaust assembly according to claim 6, wherein the exhaust system comprises a control apparatus,
the control apparatus comprises the exhaust trigger member and the reset trigger member, and the exhaust slider and the self-locking slider are located on the same side of the control apparatus and slide relative to the control apparatus to approach or move away from the control apparatus.

13. The exhaust assembly according to claim 12, wherein the exhaust slider is provided with a stopper portion configured to abut against the upper cover when the exhaust slider is in the self-locking position, to limit continued movement of the exhaust slider in a direction away from the release position.

14. The exhaust assembly according to claim 1, further comprising:
a cover rotation trigger mechanism, the self-locking member connecting with the cover rotation trigger mechanism and moving along with the cover rotation trigger mechanism, the self-locking member being provided with a trigger portion, wherein the cover rotation trigger mechanism is configured to detect a position of the upper cover relative to the pot body, and cause the trigger portion to act on the exhaust apparatus and trigger the exhaust apparatus to open, when the upper cover is in an unscrewed position relative to the pot body, and cause the trigger portion to leave the exhaust apparatus, when the upper cover is in a screwed position relative to the pot body.

15. The exhaust assembly according to claim 14, wherein the cover rotation trigger mechanism comprises:
a floating member, for connecting with the upper cover, the floating member being in a transmission connection with the self-locking member, and floating of the floating member configured to drive the self-locking member to move;
an elastic support member, for supporting the floating member; and
an adaptation portion, for connecting with the pot body and abutting against the floating member, wherein a guide inclined surface is configured between the adaptation portion and the floating member, during the rotation of the upper cover relative to the pot body, the floating member is configured to mate with the adaptation portion, the adaptation portion pushes the floating member, and the floating member drives the self-locking member to move to cause the trigger portion of the self-locking member to act on the exhaust apparatus.

16. An upper cover assembly, comprising: an upper cover; and
an upper cover; and
an exhaust assembly, comprising,
an exhaust system, configured to be opened and closed;
an exhaust trigger member, connected to the exhaust system and adapted to trigger the exhaust system to open,
a reset trigger member, connected to the exhaust system and adapted to trigger the exhaust system to close; and
a toggle member, adapted to move between an exhaust position and a closing position, wherein in the exhaust position, the toggle member acts on the exhaust trigger member and causes the exhaust trigger member to trigger the exhaust system to open, and in the closing position, the toggle member acts on the reset trigger member and causes the reset trigger member to trigger the exhaust system to close, disposed on the upper cover;
wherein the exhaust system comprises:
an exhaust apparatus, the toggle member causing, in the exhaust position, the exhaust trigger member to trigger the exhaust apparatus to open; and
a self-locking member, adapted to the exhaust trigger member and the reset trigger member, wherein the self-locking member is configured to be in a limiting fit with the exhaust trigger member to maintain the exhaust apparatus open, and when triggered by the reset trigger member, the self-locking member is released from the limiting fit with the exhaust trigger member, wherein the self-locking member comprises:
an exhaust slider, adapted to slide between a first position and a second position and configured to be in a limiting fit the exhaust trigger member in the first position; and
a slider elastic member, connected to the exhaust slider, wherein in the second position, an exhaust slider is released from the limiting fit with the exhaust trigger member and causes the slider elastic member to be compressed, and elastic restoring of the slider elastic member causes the exhaust slider to reach the first position, wherein
the self-locking member is provided with a first engagement portion, the exhaust trigger member is provided with a second engagement portion, the first engagement portion and the second engagement portion can be engaged to lock the exhaust trigger member, when the toggle member acts on the exhaust trigger member in the exhaust position, the exhaust trigger member moves downwardly to cause the second engagement portion to be engaged with the first engagement portion, and the exhaust trigger member maintains the exhaust apparatus in an opened state, when the self-locking member is triggered by the reset trigger member, the second engagement portion is disengaged from the first engagement portion, so that limiting is released between the self-locking member and the exhaust trigger member.

17. A cooking device, comprising:

an exhaust assembly, comprising:

an exhaust system, configured to be opened and closed;

an exhaust trigger member, connected to the exhaust system and adapted to trigger the exhaust system to open;

a reset trigger member, connected to the exhaust system and adapted to trigger the exhaust system to close; and a toggle member, adapted to move between an exhaust position and a closing position, wherein in the exhaust position, the toggle member acts on the exhaust trigger member and causes the exhaust trigger member to trigger the exhaust system to open, and in the closing position, the toggle member acts on the reset trigger member and causes the reset trigger member to trigger the exhaust system to close;

wherein at least one of the reset trigger member and the exhaust trigger member comprises a push rod and a push rod elastic member, the push rod elastic member is connected to the push rod, and when the toggle member acts on the push rod, the push rod triggers the exhaust system and compresses the push rod elastic member, wherein elastic restoring of the push rod elastic member causes the push rod to stop triggering the exhaust system; and a pressing plate, for connecting with an upper cover, wherein the push rod is provided with a stopping edge, the push rod passes through the pressing plate, the stopping edge is spaced apart from the pressing plate, the push rod elastic member abuts against the pressing plate and the stopping edge, and the push rod is movable relative to the pressing plate to cause the stopping edge and the pressing plate to move close to each other to compress the push rod elastic member, or to cause the stopping edge and the pressing plate to move away from each other to release the push rod elastic member.

* * * * *